(12) United States Patent
Sevin et al.

(10) Patent No.: US 11,284,435 B2
(45) Date of Patent: Mar. 22, 2022

(54) MULTI-USER COMMUNICATION IN A MULTI-BSS ENVIRONMENT OF AN 802.11 AX NETWORK

(71) Applicant: CANON KABUSHIKI KAISHA, Tokyo (JP)

(72) Inventors: Julien Sevin, Saint Aubin du Cormier (FR); Pascal Viger, Janze (FR); Patrice Nezou, Liffre (FR); Stéphane Baron, Le Rheu (FR)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 16/610,406

(22) PCT Filed: Apr. 27, 2018

(86) PCT No.: PCT/EP2018/060989
§ 371 (c)(1),
(2) Date: Nov. 1, 2019

(87) PCT Pub. No.: WO2018/202600
PCT Pub. Date: Nov. 8, 2018

(65) Prior Publication Data
US 2020/0120711 A1  Apr. 16, 2020

(30) Foreign Application Priority Data

May 3, 2017 (GB) ..................................... 1707062

(51) Int. Cl.
*H04W 74/08* (2009.01)
*H04L 5/00* (2006.01)
(Continued)

(52) U.S. Cl.
CPC ......... *H04W 74/0816* (2013.01); *H04L 5/001* (2013.01); *H04L 5/0037* (2013.01); *H04W 74/006* (2013.01); *H04W 84/12* (2013.01)

(58) Field of Classification Search
CPC .......... H04W 74/0816; H04W 74/006; H04W 84/12; H04W 74/004; H04W 72/042;
(Continued)

(56) References Cited

U.S. PATENT DOCUMENTS

| 2011/0013608 | A1* | 1/2011 | Lee ...................... H04W 72/04 370/338 |
| 2016/0227565 | A1* | 8/2016 | Ghosh ................ H04W 74/006 |
| 2016/0374078 | A1 | 12/2016 | Ghosh et al. |

OTHER PUBLICATIONS

Liwen Chu, Multiple BSSID and MU Discussion, IEEE Draft, IEEE-SA Mentor, Nov. 8, 2016, pp. 1-10, vol. 802.11ax, Piscataway, NJ, XP068110876, Retrieved from the Internet on Nov. 8, 2016, URL:https://mentor.ieee.org/802.11/dcn/16/11-16-1454-00-00ax-multiple-bssid-and-mu-discussion.pptx.

\* cited by examiner

*Primary Examiner* — Dady Chery
(74) *Attorney, Agent, or Firm* — Canon U.S.A., Inc. IP Division

(57) ABSTRACT

The invention provides multi-user communication in a MU Uplink transmission opportunity in case of a multi-BSS environment of a wireless network. Resource units with AID=0 or 2045 are available for stations to transmit data to addressee virtual access points (VAPs) other than the VAP having initiated the TXOP. The initiating VAP receiving frames from the resources forwards them to the appropriate addressee VAPs within the same physical AP. Responses may be provided by the addressee VAPs directly to the stations or via the initiating VAP or the representative VAP. This approach increases the opportunities for the stations to access the medium in case of multiple BSSs. Better usage of the MU Uplink OFDMA transmission is also made.

24 Claims, 8 Drawing Sheets

(51) Int. Cl.
*H04W 74/00* (2009.01)
*H04W 84/12* (2009.01)
(58) Field of Classification Search
CPC ... H04W 74/0833; H04L 5/001; H04L 5/0037
See application file for complete search history.

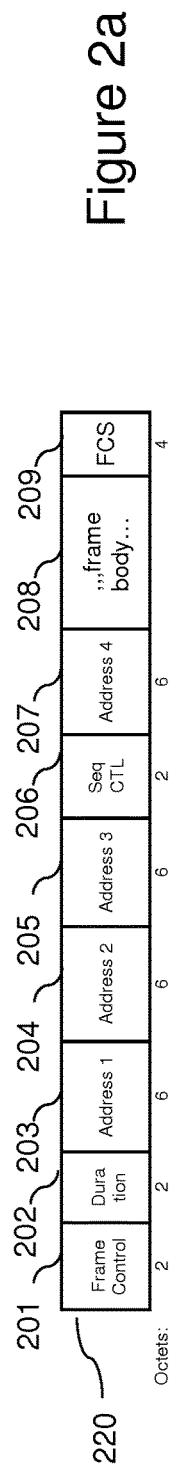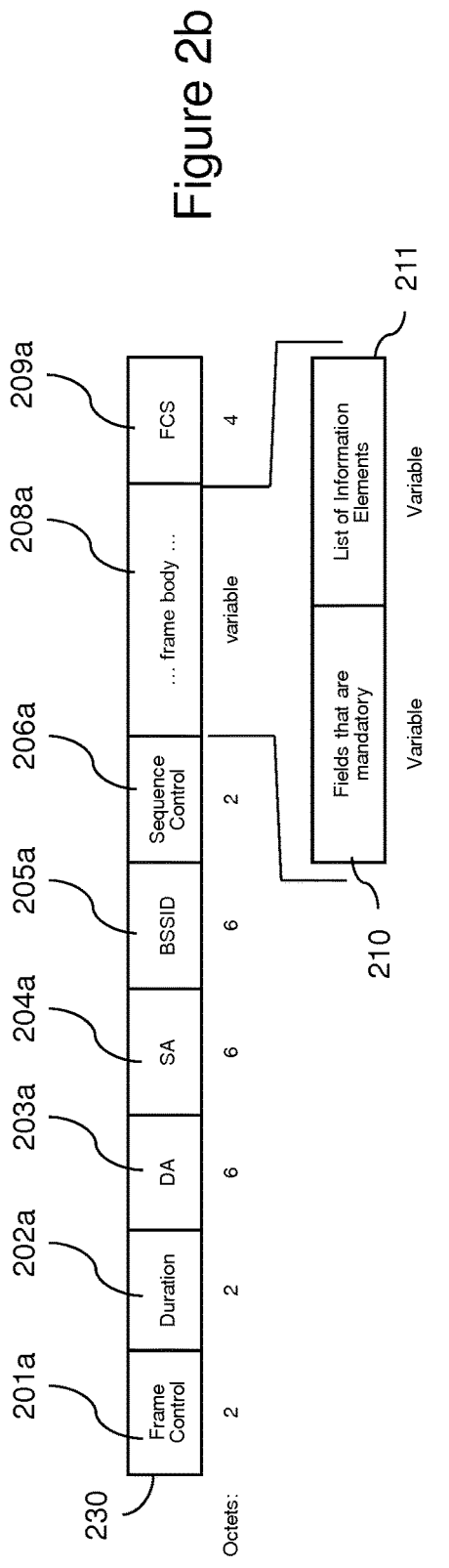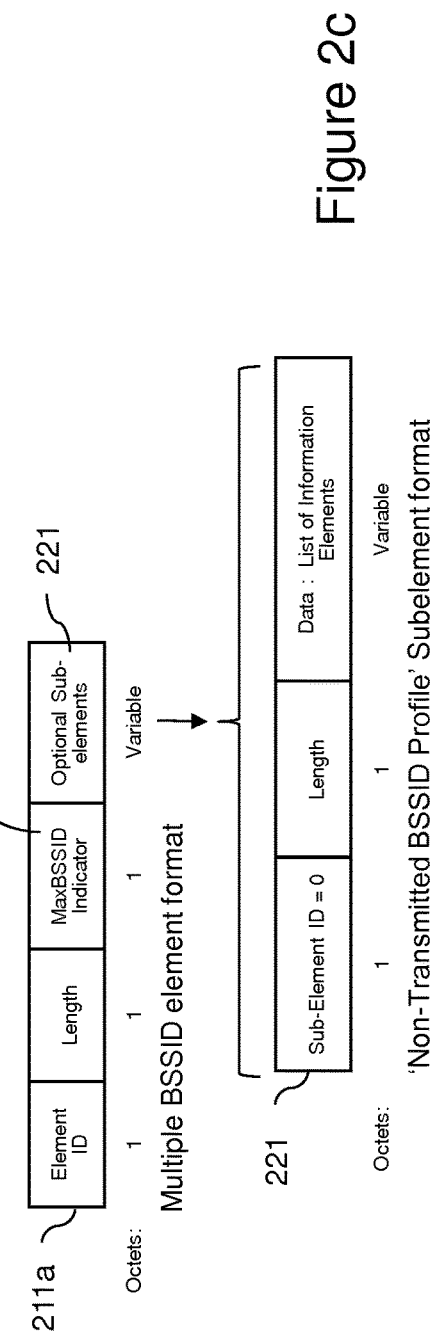

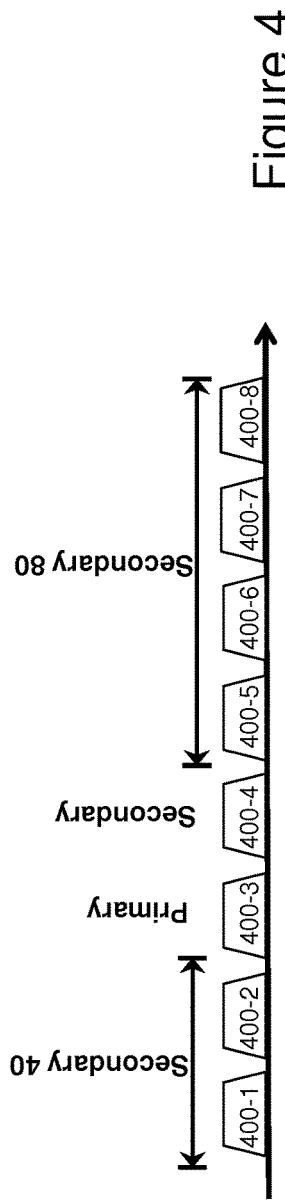
Figure 4
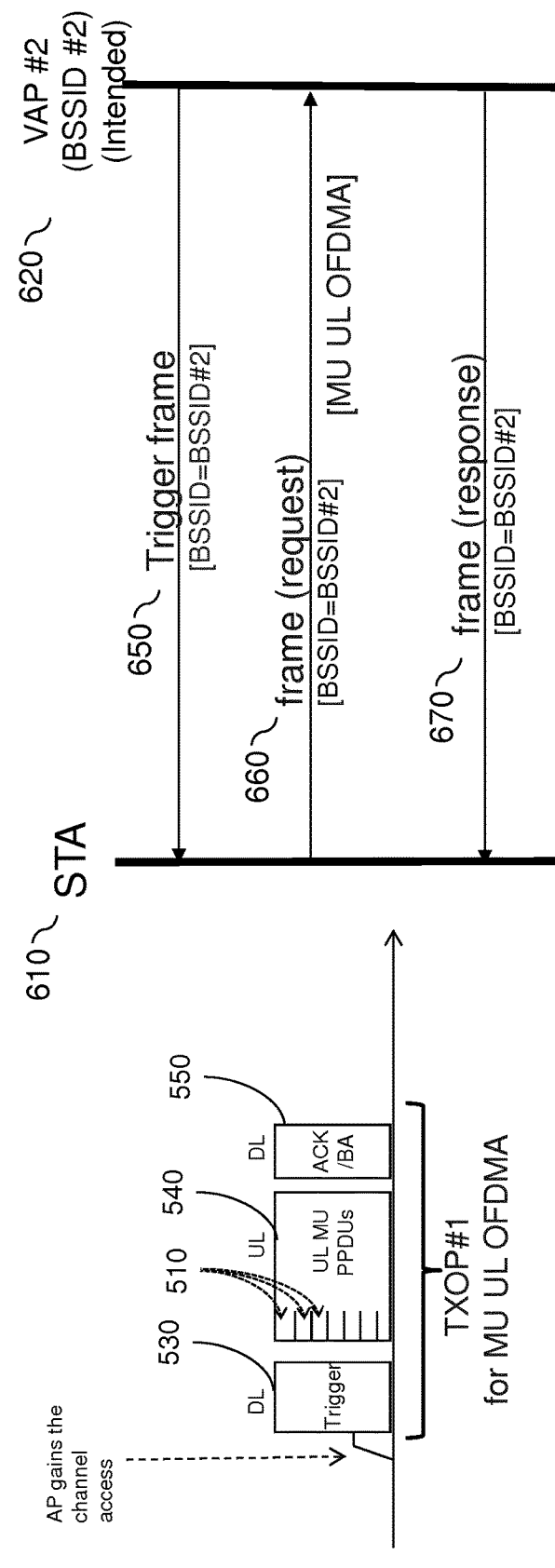
Figure 6
Figure 5

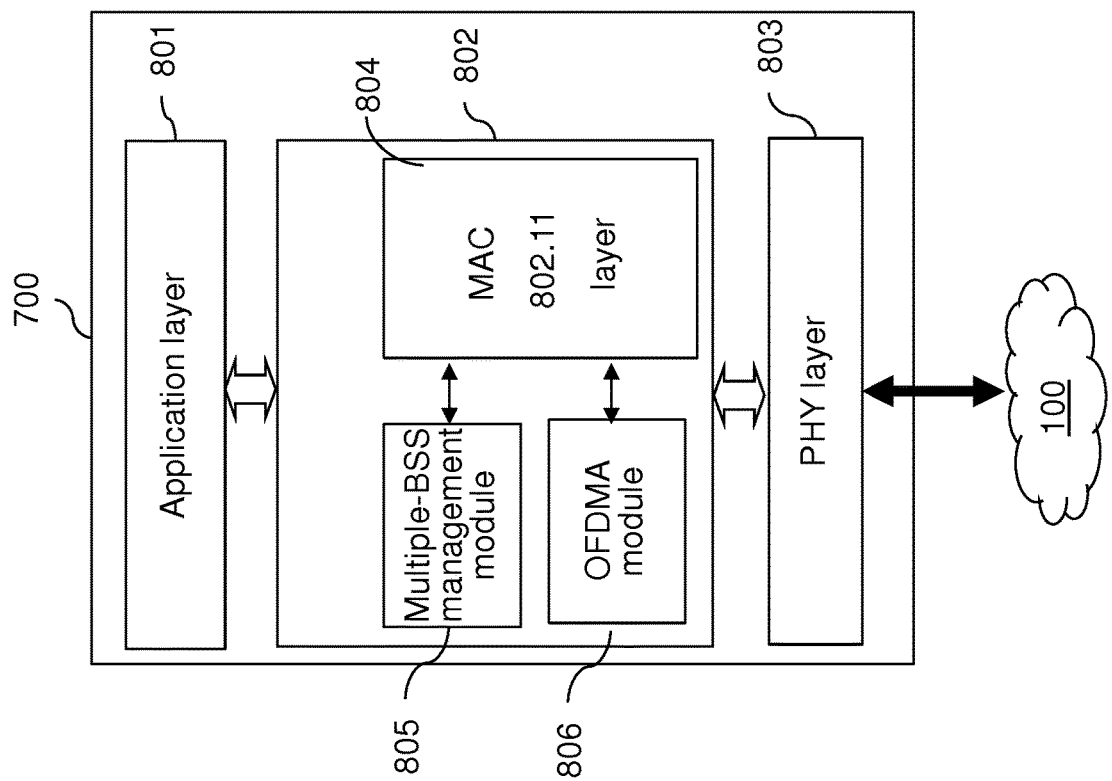
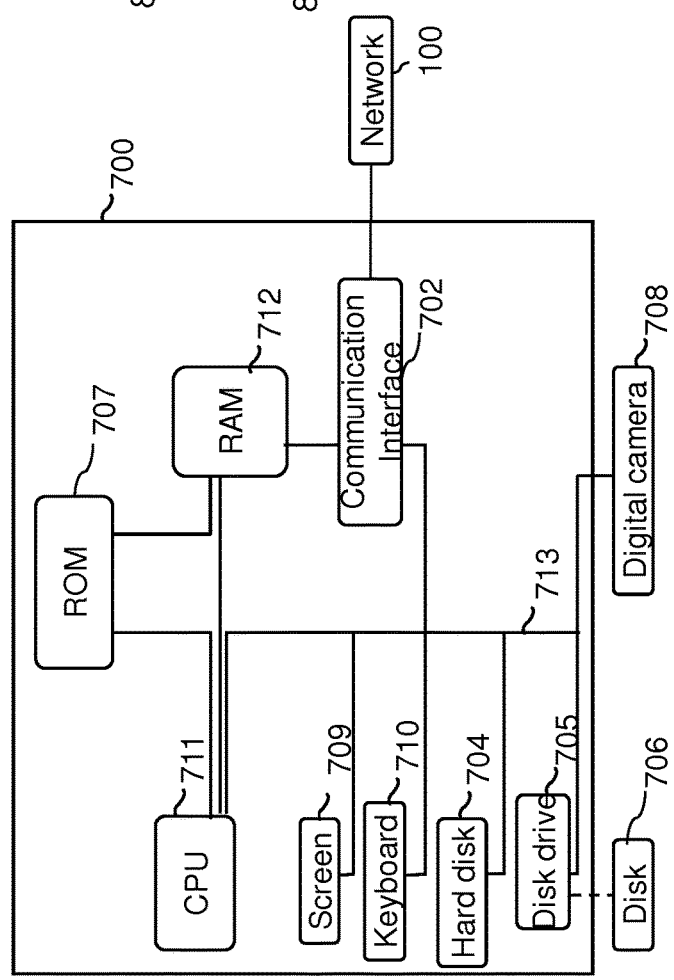
Figure 8
Figure 7

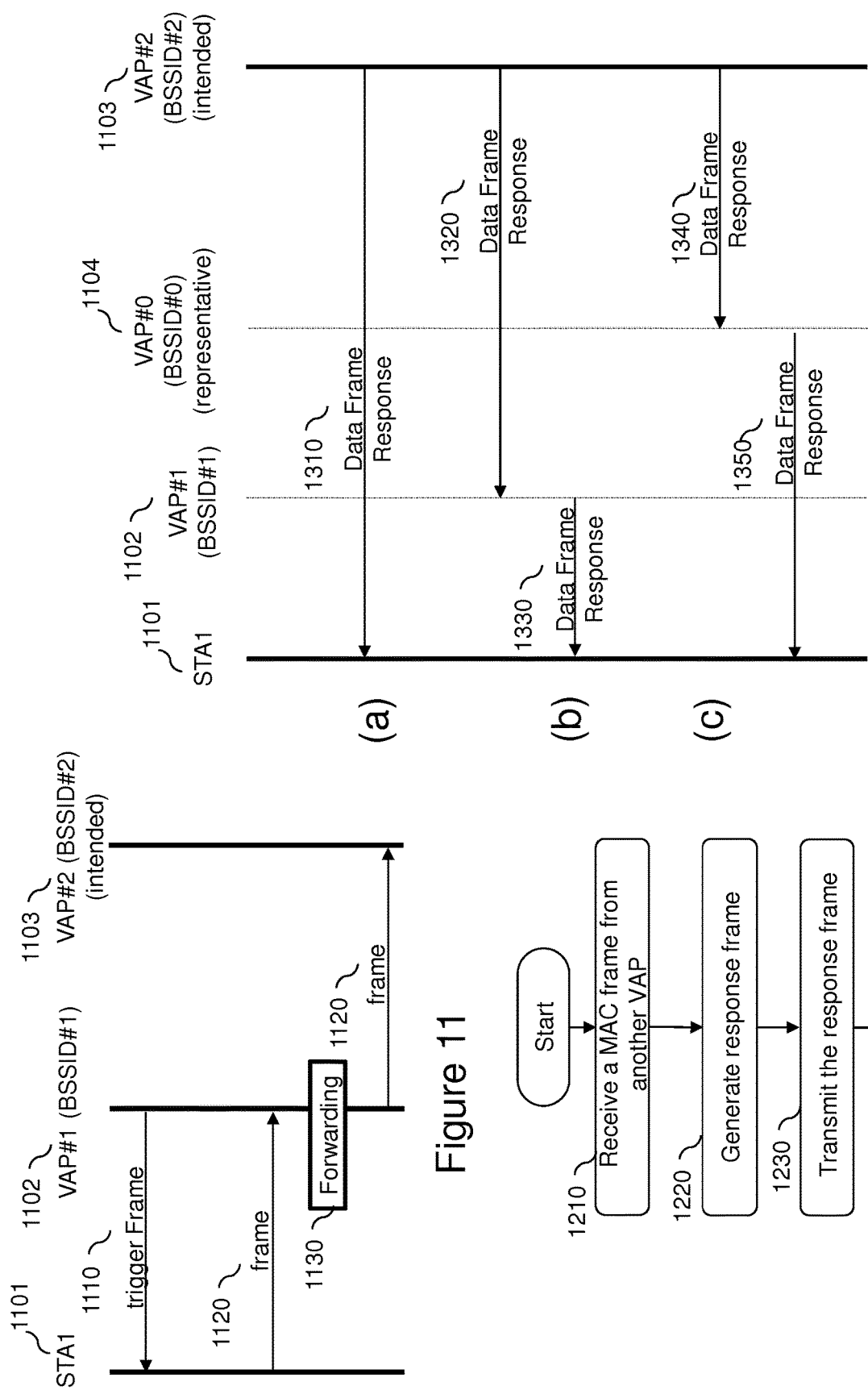

MULTI-USER COMMUNICATION IN A MULTI-BSS ENVIRONMENT OF AN 802.11 AX NETWORK

FIELD OF THE INVENTION

The present invention relates generally to wireless communication networks comprising a physical access point (AP) and stations organized into groups, also known as Basic Service Sets (BSSs), and more specifically to the transmission of data over a sub-channel or Resource Unit (RU) forming a transmission opportunity granted to the AP, and corresponding devices.

The invention finds application in wireless communication networks, in particular to the access of an 802.11ax composite channel and of OFDMA Resource Units forming for instance an 802.11ax channel for Uplink communication towards the AP. One application of the method regards wireless data communication over a wireless communication network using Carrier Sense Multiple Access with Collision Avoidance (CSMA/CA), the network being accessible by a plurality of station devices.

BACKGROUND OF THE INVENTION

The IEEE 802.11 MAC family of standards (a/b/g/n/ac/ etc.) defines a way wireless local area networks (WLANs) work at the physical and medium access control (MAC) level. Typically, the 802.11 MAC (Medium Access Control) operating mode implements the well-known Distributed Coordination Function (DCF) which relies on a contention-based mechanism based on the so-called "Carrier Sense Multiple Access with Collision Avoidance" (CSMA/CA) technique.

More recently, Institute of Electrical and Electronics Engineers (IEEE) officially approved the 802.11ax task group, as the successor of 802.11ac. The primary goal of the 802.11ax task group consists in seeking for an improvement in data speed to wireless communicating devices (or stations) used in dense deployment scenarios.

In this context, multi-user (MU) transmission has been considered to allow multiple simultaneous transmissions to/from different stations (i.e. users) registered with the AP, in both downlink (DL) and uplink (UL) directions from/to the AP, during a transmission opportunity granted to the AP over a 20 MHz (or more) communication channel.

In the uplink, multi-user transmissions are used to mitigate the collision probability. This is because multiple non-AP stations are allowed to transmit simultaneously.

To actually perform such multi-user transmission, it has been proposed to split a granted communication channel (or transmission opportunity granted to the AP) into sub-channels, also referred to as resource units (RUs), that are usually shared in the frequency domain between multiple users (non-AP stations/nodes), based for instance on Orthogonal Frequency Division Multiple Access (OFDMA) technique.

Both multi-user Downlink OFDMA and Uplink OFDMA mechanisms offer overhead reduction as key benefit.

To perform multi-user (MU) Uplink OFDMA transmission, the AP sends a control frame, known as Trigger Frame (TF), to the stations prior they can access one RU of the MU Uplink OFDMA transmission, either assigned to them or randomly accessible through contention. RUs are assigned to specific stations in the TF, using the AIDs associated with the stations upon registration with the AP. Random RUs are signalled in the TF using an AID set to specific value, and may be accessed by any station registered with the AP.

This describes how the stations are managed within a single BSS handled by the AP with which they have registered.

In the 802.11 standard, each BSS is uniquely identified using a specific basic service set identification, BSSID. For a BSS operating in infrastructure mode, the specific BSSID is usually a 48-bit MAC address of the access point. The specific BSSID is the formal name of the BSS and is always associated with only one BSS.

Together with the specific BSSID, each BSS has its own service set identification, SSID, which is an informal (human) name of the BSS (since this own SSID identifier is often entered into devices manually by a human user).

Recent developments provide that a single physical AP can operate as the master stations of a plurality of BSSs, i.e. of a plurality of independent groups of stations. This avoids using one physical AP per BSS or WLAN. It also makes it possible to use the same primary channel for all BSSs, thereby avoiding channel interference problems. In such a case, it is said that the physical AP supports Multi-BSSID functionality. For the non-AP stations, nothing changes.

When a physical AP supports the multi-BSSID functionality, the operating scheme is performed through so-called virtual access points (virtual APs or VAPs) instantiated at the physical AP.

A Virtual AP is a logical entity that resides within the physical Access Point (AP) to manage one of the BSSs. Each VAP appears to the non-AP stations as an independent access point with its own unique SSID.

To implement virtual APs, multiple BSSIDs are used with associated SSIDs. The BSSIDs for the VAPs in the physical AP are usually generated from a base BSSID specific to the underlying physical AP, usually the base MAC address of the AP.

The terms Virtual AP (VAP), specific BSSID, BSS and SSID can be used synonymously to designate one of the groups or cells of stations managed by the physical AP.

Depending on the context, specific BSSID and own SSID may further refer to the identifier of the corresponding BSS/WLAN, either through a MAC address (specific BSSID) or an informal (human) name (own SSID).

Providing a plurality of SSIDs (or BSSs) corresponds to providing various different networks in a particular area. It can give access to different resources and present services which may have differing management or security policies applied. This advantageously allows various categories of user, e.g. staff, students or visitors etc. to be provided with network services which are appropriate to them.

In conventional 802.11 approaches, only one SSID (or BSS) is advertised per signalling message such as a beacon frame. As a consequence, multiple beacon frames are used to advertise the SSIDs corresponding to the virtual APs configured at the physical AP. This solution is compatible with most 802.11 stations and also allows the SSIDs to support different capability sets.

However, as the number of BSSs increases, more channel utilization results from such signalling. This downside is further increased because the signalling messages are transmitted at low bit rate, usually at the lowest supported data rate so that all clients can receive it.

To improve this situation of increased channel utilization in case of multiple BSSs, the IEEE 802.11v Wireless Network Management specification defines a mechanism to advertise network information (e.g. security profiles including BSSID/SSID and protection security schemes) of multiple BSSs with a single beacon frame. This can be made by only one of the VAPs of the physical AP, namely the "representative" or "transmitted" VAP.

When a physical AP supports the multi-BSSID functionality, the handling of MU Uplink OFDMA transmission is made independently within each BSS as described above: the corresponding VAP sends a trigger frame identifying the concerned BSS (using the corresponding BSSID), thereby providing RUs to the stations of the concerned BSS only.

Things are slightly different with the representative VAP, which may assign and thus open access to some RUs triggered by a sent trigger frame, to stations not belonging to its respective BSS.

Recently, the 802.11ax task group has proposed a mechanism for the AP to reserve one or more RUs of a MU Uplink OFDMA transmission for not-yet-associated stations (which are 802.11ax compliant). This is for these stations to speed up their registration with the AP, by transmitting request management frames over such reserved RUs (in MU Uplink OFDMA mode). The proposed mechanism relies on the use of a predefined AID value equal to 2045 to indicate such random RUs the not-yet-associated stations can access through contention.

The independence between the BSSs and thus between the associated granted MU Uplink OFDMA transmissions makes that each station registered with a specific VAP or willing to register with it may have to wait for a long and unknown time before a MU Uplink OFDMA transmission for the appropriate BSS is triggered. This is particularly unsatisfactory during the association process of registration with a VAP as the user usually does not want to wait a long time before being connected. Thus, it is detrimental to user experience.

The current operating mode of the 802.11ax multi-user feature is thus not fully satisfactory, for at least the above downsides regarding the multi-BSSID functionality.

SUMMARY OF INVENTION

It is a broad objective of the present invention to improve this situation, i.e. to overcome some or all of the foregoing limitations. In particular, the present invention seeks to provide a more efficient usage of the MU Uplink transmission towards the AP in the context of multiple BSSs.

In particular, the Multi-User Uplink communication protocol is enhanced to allow the stations of a BSS (or willing to join such BSS) to use RUs provided during the MU Uplink transmission of another BSS, provided that their communications are forwarding to the appropriate virtual AP.

In this context, the present invention proposes enhanced wireless communication methods in a wireless network comprising a physical access point and stations organized into groups, the physical access point implementing a plurality of virtual access points, each virtual access point managing a group of the stations and a single one of the virtual access points being a representative virtual access point authorized to broadcast network information about a non-representative virtual access point. Such broadcasting of network information means advertise network information, e.g. security profiles including BSSID/SSID and/or protection security schemes, of multiple BSSs with a single control frame, e.g. a beacon frame.

In embodiments, the method comprises following steps, at a transmitting station willing to transmit data to a second virtual access point managing a second group of stations:

receiving a trigger frame from a first virtual access point over the wireless network, the trigger frame identifying a first group of stations managed by the first virtual access point different from the second group and reserving a transmission opportunity on at least one communication channel of the wireless network, the transmission opportunity including resource units that form the communication channel and that stations access to transmit data during the reserved transmission opportunity; and accessing one of the resource units not assigned to a specific station during the transmission opportunity and transmitting data intended to the second virtual access point, over the accessed resource unit to the first virtual access point.

From the AP perspective, enhanced wireless communication methods are also proposed.

In embodiments, the method comprises following steps, at the physical access point:

sending, by a first virtual access point managing a first group of stations, a trigger frame identifying the first group of stations, to reserve a transmission opportunity on at least one communication channel of the wireless network, the transmission opportunity including resource units that form the communication channel and that stations access to transmit data during the reserved transmission opportunity;

in response to the trigger frame, receiving, over one of the resource units during the reserved transmission opportunity, data from a transmitting station and addressed to a second (representative or non-representative, but different) virtual access point managing a second group of stations, different from the first group identified in the trigger frame; and forwarding the received data to the second virtual access point managing the second group of stations.

By allowing the first VAP to forward received data not intended to itself (instead of discarding them) to a second VAP within the same physical AP, the present invention makes it possible for the non-AP stations to use RUs provided within a BSS different from their targeted BSS (with which they are registered or willing to register).

Non-AP stations may thus access RUs within MU Uplink transmissions more often, thereby reducing their waiting time. This is particularly advantageous to speed up the association process of registration with a VAP.

Also, there is provided a wireless communication device forming station in a wireless network comprising a physical access point and stations organized into groups, the physical access point implementing a plurality of virtual access points, each virtual access point managing a group of the stations and a single one of the virtual access points being a representative virtual access point authorized to broadcast network information about a non-representative virtual access point. The device forming station willing to transmit data to a second virtual access point managing a second group of stations and comprises at least one microprocessor configured for carrying out steps of:

receiving a trigger frame from a first virtual access point over the wireless network, the trigger frame identifying a first group of stations managed by the first virtual access point different from the second group and reserving a transmission opportunity on at least one communication channel of the wireless network, the transmission opportunity including resource units that form the communication channel and that stations access to transmit data during the reserved transmission opportunity; and accessing one of the resource units not assigned to a specific station during the transmission opportunity and transmitting data intended to the second virtual access point, over the accessed resource unit to the first virtual access point.

Also, there is provided a wireless communication device forming physical access point in a wireless network comprising a physical access point and stations organized into groups. The device forming physical access point comprises at least one microprocessor configured for implementing a plurality of virtual access points, each virtual access point managing a group of the stations and a single one of the virtual access points being a representative virtual access point authorized to broadcast network information about a non-representative virtual access point. The microprocessor is further configured for carrying out steps of:

sending, performed by a first virtual access point managing a first group of stations, a trigger frame identifying the first group of stations, to reserve a transmission opportunity on at least one communication channel of the wireless network, the transmission opportunity including resource units that form the communication channel and that stations access to transmit data during the reserved transmission opportunity;

in response to the trigger frame, receiving, over one of the resource units during the reserved transmission opportunity, data from a transmitting station and addressed to a second virtual access point managing a second group of stations, different from the first group identified in the trigger frame; and forwarding the received data to the second virtual access point managing the second group of stations.

Optional features of these embodiments are defined in the appended claims with reference to methods. Of course, same features can be transposed into system features dedicated to any device according to the embodiments of the invention.

In some embodiments, the first virtual access point is a non-representative virtual access point.

In other embodiments, the steps of receiving and forwarding are performed by the first virtual access point. In that case, the physical layer of the physical AP may receive the data and transmit them to the VAP having sent the trigger frame, this VAP being in charge of performing the appropriate data forwarding. Variants may contemplate having the physical layer of the physical AP forwarding (or broadcasting) the received data to each and every VAP implemented at the physical AP.

In some embodiments, any station registering with a virtual access point is associated with a unique association identifier used by the virtual access point to assign, to the station, a resource unit in a transmission opportunity granted to the virtual access point, and the resource unit conveying the data of the transmitting station is assigned to an association identifier not associated with a specific station.

It means that a station willing to transmit data to another BSS (different from the one for which the TF has been sent) may use RUs having such AID not associated with a specific station. This makes it possible for the stations to easily identify which RUs can be used for another BSS.

In specific embodiments, the association identifier not associated with a specific station takes a first AID value, for instance equal to 0, to signal a resource unit in which any station already registered with any virtual access point implemented by the physical access point can transmit data. This makes the processing of the data to be forwarded by the first VAP easier, as they are concentrated over the RUs with the specific first AID value.

In some embodiments, the transmitted data include a data frame intended to the second virtual access point. A data frame is not dedicated to signalling, e.g. network signalling (such as management frames of 802.11) and communication signalling (such as control frames of 802.11).

In other specific embodiments, the association identifier not associated with a specific station takes a second AID value, for instance equal to 2045, to signal a resource unit in which only a station not yet registered with one of the virtual access points can transmit data. This makes it possible for the stations to speed up, with no additional cost, their registration with any VAP, and not only with the VAP having sent the trigger frame.

Indeed, the transmitted data may include a management frame intended to the second virtual access point within a procedure of associating the transmitting station with the second virtual access point.

In some embodiments, the resource unit conveying the data of the transmitting station is a random resource unit to which stations randomly access using contention-based access. Indeed, this makes it possible for any not-designated station to gain access to the RU, in particular if the station belongs to another BSS.

In some embodiments, the data include a frame header in which at least one address field is set to a basic service set identification, BSSID, uniquely identifying the second group of stations (i.e. the second virtual access point). Thanks to this indication, the first VAP can quickly determine when forwarding received data (if it is not its own BSSID) and to which VAP of the same physical AP.

Indeed, the method may further comprise, at the first virtual access point, determining whether a frame header of the received data includes an address field set to the BSSID uniquely identifying the second group of stations, and forwarding the received data in case of positive determining.

According to specific features, the at least one address field includes one or both of a receiver address and a destination address signalled in the frame header. This makes the invention compliant with the conventional MAC frame format. Furthermore, the frame header may further include a source address field set to an address of the transmitting station.

According to another specific feature, the BSSID uniquely identifying the second group of stations is a 48-bit MAC address assigned to the second virtual access point.

In some embodiments, the method at the AP may further comprise, at the second virtual access point:
generating a response to the received data, and
transmitting directly the generated response to the transmitting station.

It means the response does not use the same transmission path as the data (no relay through the first VAP is made). This is simple to implement with low processing by the physical AP.

Correspondingly, the method may further comprise, at the transmitting station, receiving a response to the transmitted data, directly from the second virtual access point.

In variants, the method at the AP may further comprise, at the second virtual access point:
generating a response to the received data, and
forwarding the generated response to another (intermediary) virtual access point implemented at the physical access point for transmission to the transmitting station.

Correspondingly, the method may further comprise, at the transmitting station, receiving a response to the transmitted data, from the second virtual access point via another virtual access point implemented at the physical access point.

For instance, the other virtual access point may be the first virtual access point or the representative virtual access point.

In the first case, the first VAP may advantageously use the same transmission opportunity, thus reducing overall latency. Indeed, the VAP may provide both MU Uplink and Downlink OFDMA transmissions within the same TXOP.

In the second case, numerous, possibly all, responses can be concentrated at the representative VAP, which in turn may efficient use a MU Downlink OFDMA transmission to transmit all the responses shortly.

In this case of response path with relay, a frame header of the response may include a receiver address field set to a basic service set identification, BSSID, uniquely identifying the group of stations managed by the other virtual access point, a transmitter address field set to a BSSID uniquely identifying the second group of stations managed by the second virtual access point and a destination address field set to an address of the transmitting station.

In some embodiments, the transmitted data include a MAC frame embedded in an 802.11ax frame.

Another aspect of the invention relates to a non-transitory computer-readable medium storing a program which, when executed by a microprocessor or computer system in a device, causes the device to perform any method as defined above.

The non-transitory computer-readable medium may have features and advantages that are analogous to those set out above and below in relation to the methods and devices.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

FIG. 2a illustrates the format of a conventional 802.11 MAC frame;

FIG. 2b illustrates an exemplary format of a beacon frame;

FIG. 2c illustrates an exemplary format of a Multiple BSSID element used in beacon frames;

FIG. 4 illustrates 802.11ac channel allocation that support channel bandwidth of 20 MHz, 40 MHz, 80 MHz or 160 MHz as known in the art;

FIG. 5 illustrates an example of 802.11ax MU Uplink OFDMA transmission scheme, wherein the AP issues a Trigger Frame for reserving a transmission opportunity of OFDMA sub-channels (resource units) as known in the art;

FIG. 6 illustrates a sequence diagram of data exchange between a non-AP station and a VAP via the MU Uplink OFDMA access scheme as defined in 802.11ax;

FIG. 7 shows a schematic representation a communication device in accordance with embodiments of the present invention;

FIG. 8 shows a schematic representation of a wireless communication device in accordance with embodiments of the present invention;

FIG. 11 illustrates a sequence diagram of corresponding data exchange in 802.11ax from a non-AP station to a physical AP supporting the Multi-BSSID functionality according to embodiments of the invention;

FIG. 12 illustrates, using a flowchart, exemplary operations at an addressee virtual access point according to embodiments of the invention;

FIG. 13 illustrates sequence diagrams of corresponding data exchange in 802.11ax from the addressee VAP according to various embodiments of the invention.

DETAILED DESCRIPTION

The invention will now be described by means of specific non-limiting exemplary embodiments and by reference to the figures.

Figure 1:
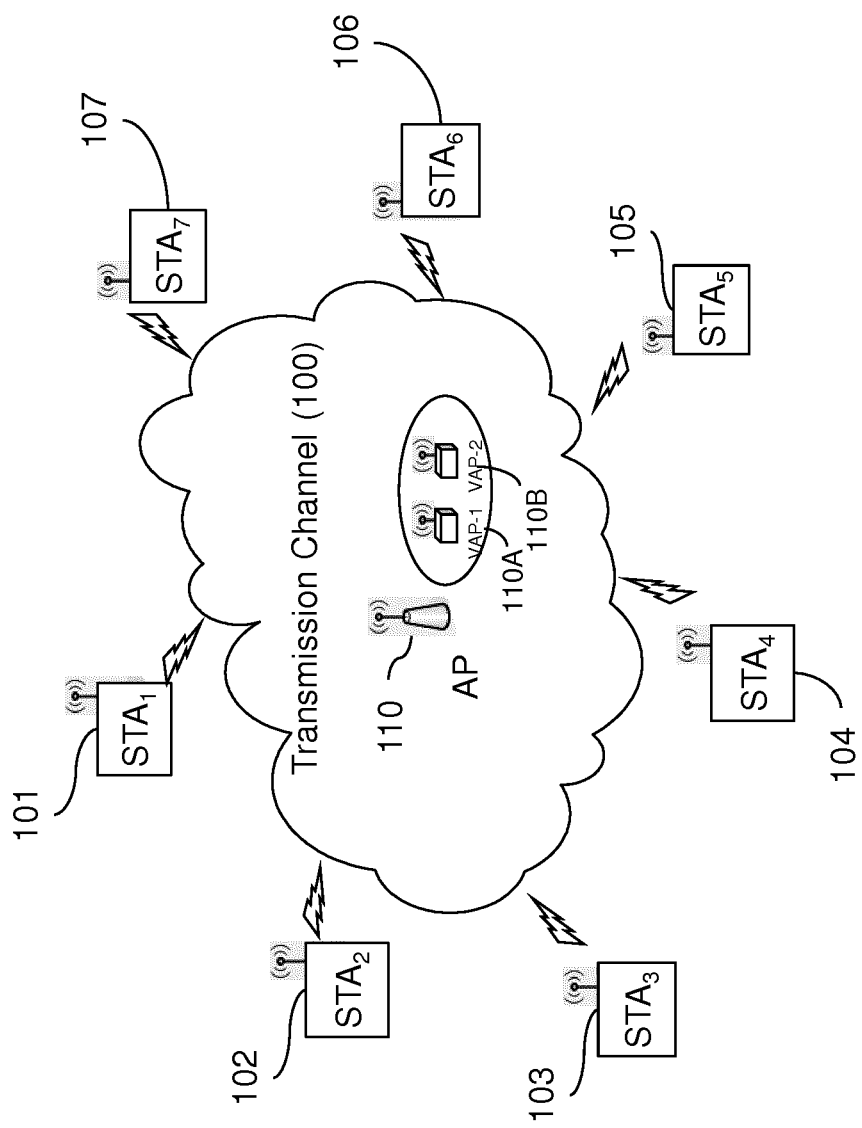
FIG. 1 illustrates a typical wireless communication system in which embodiments of the invention may be implemented.

FIG. 1 illustrates a communication system in which several communication nodes (or stations) 101-107 exchange data frames over a radio transmission channel 100 of a wireless local area network (WLAN), under the management of a central station, or access point (AP) 110. The radio transmission channel 100 is defined by an operating frequency band constituted by a single channel or a plurality of channels forming a composite channel.

Access to the shared radio medium to send data frames is based on the CSMA/CA technique, for sensing the carrier and avoiding collision by separating concurrent transmissions in space and time.

Carrier sensing in CSMA/CA is performed by both physical and virtual mechanisms. Virtual carrier sensing is achieved by transmitting control frames to reserve the medium prior to transmission of data frames.

Next, a source or transmitting station, including the AP, first attempts through the physical mechanism, to sense a medium that has been idle for at least one DIFS (standing for DCF InterFrame Spacing) time period, before transmitting data frames.

However, if it is sensed that the shared radio medium is busy during the DIFS period, the source station continues to wait until the radio medium becomes idle.

To access the medium, the station starts a countdown backoff counter designed to expire after a number of timeslots, chosen randomly in a contention window range

[0, CW], CW (integer) being also referred to as the Contention Window size and defining the upper boundary of the backoff selection interval (contention window range). This backoff mechanism or procedure is the basis of the collision avoidance mechanism that defers the transmission time for a random interval, thus reducing the probability of collisions on the shared channel. After the backoff time period, the source station may send data or control frames if the medium is idle.

One problem of wireless data communications is that it is not possible for the source station to listen while sending, thus preventing the source station from detecting data corruption due to channel fading or interference or collision phenomena. A source station remains unaware of the corruption of the data frames sent and continues to transmit the frames unnecessarily, thus wasting access time.

The Collision Avoidance mechanism of CSMA/CA thus provides positive acknowledgement (ACK) of the sent data frames by the receiving station if the frames are received with success, to notify the source station that no corruption of the sent data frames occurred.

The ACK is transmitted at the end of reception of the data frame, immediately after a period of time called Short InterFrame Space (SIFS).

If the source station does not receive the ACK within a specified ACK timeout or detects the transmission of a different frame on the channel, it may infer data frame loss. In that case, it generally reschedules the frame transmission according to the above-mentioned backoff procedure.

FIG. 2a illustrates the format of a conventional 802.11 MAC frame.

An 802.11 MAC frame contains a MAC header (fields 201 to 207), a Frame Body 208, and a Frame Check Sequence (FCS) 209.

The MAC header includes the following fields: a Frame Control field 201 to indicate that the type and subtype of the frame: data frame, management frame (beacon, authentication, association frame subtype); a duration field 202; a sequence control field 206.

In addition, it may contain up to four address fields: a first address field 203, referred to as address 1 field, a second address field 204, referred to as address 2 field, a third address field 205, referred to as address 3 field and a fourth address field 207, referred to as address 4 field. The meaning of these address fields varies from one frame type to the other, and the content of each one is one from a Source Address (SA) corresponding to a 48-bit identifier that identifies the source of the current transmission of the frame, a Destination Address (DA) corresponding to a 48-bit IEEE MAC identifier that identifies the final recipient of the frame, a Receiver Address (RA) corresponding to a 48-bit IEEE MAC identifier that identifies the next immediate recipient of the frame, a Transmitter Address (TA) corresponding to a 48-bit IEEE MAC identifier that identifies the wireless interface that transmitted the frame onto the wireless medium, and a Basic Set Service Set ID (BSSID) corresponding to a 48-bit identifier that identifies the Basic Service Set of the VAP considered.

If the 802.11 MAC frame is a data frame, the content of each address fields depends on the type of transmission (uplink or downlink).

In particular, for an uplink transmission from a non-AP station to a VAP, the transmitted data frame sets the address fields as following: address 1 field is set to RA(=BSSID), address 2 field is set to TA (=SA), address 3 is set to DA, and address 4 is not used.

For a downlink transmission from a VAP to a non-AP station, the transmitted data frame sets the address fields as following: address 1 field is set to RA(=DA), address 2 field is set to TA (=BSSID), address 3 is set to SA, and address 4 is not used.

This is summarized below:

| Transmission mode | Address 1 | Address 2 | Address 3 | Address 4 |
|---|---|---|---|---|
| Uplink: STA to AP | RA = BSSID | TA = SA | DA | Not used |
| Downlink: AP to STA | RA = DA | TA = BSSID | SA | Not used |

On the other hand, if the 802.11 MAC frame is a management frame, the content of each address fields is set as following: address 1 field is set to DA, address 2 field is set to SA, address 3 is set to BSSID identifying the BSS in which the management occurs.

| Address 1 | Address 2 | Address 3 | Address 4 |
|---|---|---|---|
| DA | SA | BSSID | Not used |

Back to FIG. 1, in IEEE 802.11 standards, the AP and the stations registered with it are referred together as a basic service set (BSS), each BSS being identified by a network identifier referred to as basic set identifier (BSSID).

The AP may advertise information about the WLAN (characteristics of the connection offered to the BSS members) using management frames, known as beacon frames. Note that a beacon frame can also be used by stations in an independent BSS (IBSS), i.e. an ad-hoc network that contains no access point. As an example, some stations may act as a soft-AP (software implemented), that is to say implementing all the functionalities of an IEEE 802.11 Access Point but in an ad-hoc or transient connection mode typically for a specific purpose (e.g. document sharing during a meeting or multiple-player computer games).

FIG. 2b illustrates an exemplary format of such a beacon frame (other formats may exist).

Illustrated beacon frame 230 contains 24 bytes of MAC header (fields 201a to 206a), 0 to 2312 bytes of Frame Body 208a, and four bytes of Frame Check Sequence (FCS) 209a. The MAC header includes the following fields: a frame control field 201a to indicate that the frame is a management frame of beacon subtype, a duration field 202a set to zero, a DA field 203a set to broadcast value FF:FF:FF:FF:FF:FF, a SA field 204a and a BSSID field 205a.

The Frame Body is a field of variable length and consists of two sets of fields: fields that are mandatory 210, followed by optional fields in the form of Information Elements (IEs) 211.

Mandatory information in field 210 may contain a Timestamp representing the time at the access point, which is the number of microseconds the AP has been active, and allowing synchronization between non-AP stations in a BSS; Beacon Interval representing the number of time units (TUs) between successive target beacon transmission times (TBTTs); and capability Info to indicate requested or advertised optional capabilities and Supported Rates fields.

All Information Elements in field 211 share a common general format consisting of a 1-byte Element ID field, a 1-byte Length field, an optional 1-byte Element ID Extension field, and a variable-length element-specific Information field. Each information element is identified by the contents of the Element ID and, when present, Element ID Extension fields as defined in the 802.11 standard. The Length field specifies the number of bytes following the Length field.

Back to FIG. 1, since 802.11v, IEEE 802.11 Baseline spec supports the Multi-BSSID functionality where a single physical AP implements multiple APs, also known as "virtual APs" or VAP, to provide multiple local WLANs (or BSSs). In particular, such Multi-BSSID functionality allows for instance the representative VAP to send only one beacon frame to advertise network information about n non-representative virtual AP, instead of having each VAP sending its own beacon frame (thus n beacon frames on the medium).

In FIG. 1, the physical AP 110 supports multiple BSSs and thus implement two or more VAPs to manage two or more respective WLANs (or BSSs), i.e. two or more groups of stations. Each BSS has to be uniquely identified by a specific basic service set identification, BSSID.

In the Figure, the physical AP 110 implements two virtual APs, virtual AP 1 VAP-1 (110A) having MAC address MAC1 as specific BSSID to manage a first WLAN (BSS) with "guest" as SSID, and virtual AP 2 VAP-2 (110B) having MAC address MAC2 as specific BSSID to manage a second WLAN (BSS) with "Employee" as SSID. The security for each WLAN may be different, i.e. WEP and WPA. Of course more WLANs can be implemented, requiring a corresponding number of virtual APs to be implemented in the physical AP.

Some stations can register with VAP-1 and thus join the first WLAN "guest", while other stations can simultaneously register with VAP-2 and thus join the second WLAN "Employee".

An AP device that supports multiple BSSIDs includes two types of virtual APs. The first one is referred to as "transmitted AP" or "representative AP". Its BSSID is referred to as transmitted BSSID. It takes the primary role to transmit Multiple BSSID elements in beacon and probe response frames. For a given physical AP, only one virtual AP is designated as transmitted AP.

The second type of virtual APs is referred to as "non-representative AP" or "non-transmitted AP". Its BSSID is referred to as non-transmitted BSSID. The non-representative APs correspond to other virtual APs which shall not broadcast beacon frames with Multiple BSSID elements. However they may broadcast beacon frames specific to their own BSS, i.e. without Multiple BSSID elements, in order to associate legacy STAs (stations not implementing IEEE 802.11v) with itself.

Such beacon frame with multiple BSSID elements may be of the type shown in FIG. 2b in which the frame body 211 includes one or more of such BSSID elements to advertise about a plurality of BSSs. The SA 204a and BSSID 205a fields of the beacon frame are thus sets to the MAC address of the representative virtual AP transmitting the beacon frame.

A Multiple BSSID information element is defined in such single beacon frame to carry the common, inherited information element values of all of the BSSIDs and the unique information elements of the non-representative BSSIDs (non-representative VAPs). Any station can thus derive the BSSIDs of the non-representative VAPs from the Multiple BSSID information element.

FIG. 2c illustrates an exemplary format of a Multiple BSSID element.

The multiple BSSID information element, referenced 211a, comprises a 1-byte MAX BSSID indicator field 220 and a variable length Optional Sub-elements field 221. The MAX BSSID Indicator field is 'n', where $2^n$ is the maximum number of BSSIDs supported by the physical access point 110, including the representative BSSID. Optional Sub-elements field 221 contains zero or more sub-elements in its Data field, such as for example the "non-representative BSSID profile" sub-element (each advertising network information of a non-representative BSS).

A "non-representative BSSID Profile" is identified by a Sub-element ID of value 0, and shall include the SSID and multiple BSSID-index sub-elements for each of the supported BSSIDs. It may include a Capabilities field followed by a variable number of information elements.

The beacon frame may include two or more Multiple BSSID elements containing elements for a given BSSID index.

When a station receives a beacon frame with a Multiple BSSID element that consists of a non-representative BSSID profile with only the mandatory elements (Capability element, SSID and multiple BSSID-index), the station may inherit the complete profile from a previously received beacon frame.

All MAC addresses identifying the virtual APs are generated based on (or "derive from") a base MAC address specific to the physical access point, usually the base 48-bit MAC address of AP 110. For instance $MAC_i$ ('i' being a BSS index) used as specific BSSID(i) for virtual $AP_i$ is generated as follows, from the base MAC address BASE_BSSID:

$$MAC_i=BSSID(i)=(BASE\_BSSID \text{ modified to set the } n \text{ LSBs to zero})|((n \text{ LSBs of BASE\_BSSID})+i) \bmod 2^n)$$

where LSB refers to the least significant bits, "n" is an AP parameter (integer) defining the maximum number (about $2^n$) of possible specific BSSIDs, and '|' operator is an XOR operator. The specific BSSID(i)s thus differ from one another by their n LSBs. The 48-n MSBs of the generated specific BSSIDs are all similar to the corresponding bits of BASE_BSSID.

The same non-AP station can join two WLANs simultaneously only if it has two separate WLAN interfaces (e.g. wifi network cards). In that case, the device is considered as two stations in the network, each station being registered with only one WLAN at a time.

For the stations to be aware of available WLANs (or BSSs) and of the information defining them (for instance corresponding SSID or SSIDs, corresponding specific BSSID or BSSIDs, communication mode including Infrastructure or Ad-Hoc, protection security schemes used including Open, WEP, WPA-PSK or 802.1X, support transmission rates used, channel in operation, and any optional Information Elements), the VAPs send some control or management frames, including beacon frames and probe response frames which have substantially the same content.

Figure 3:
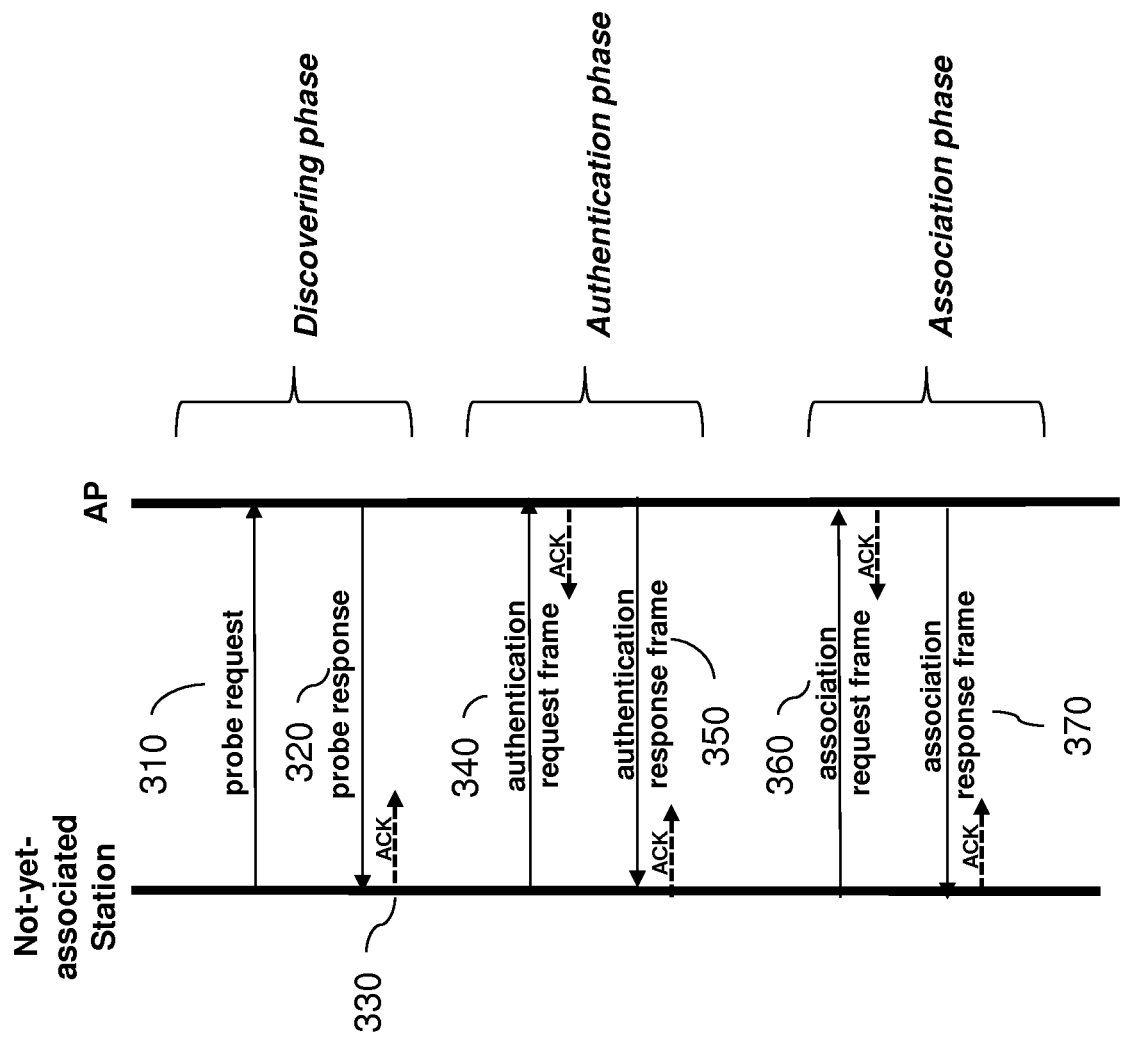
FIG. 3 illustrates an exemplary sequence of management frames allowing a not-yet-associated station to discover and register with a given Access Point.

FIG. 3 illustrates an exemplary sequence of management frames allowing a not-yet-associated station to discover and register with a given Access Point. It comprises three phases: WLAN discovery, authentication and association, at the end of which the station enters into an authenticated and associated state with the AP. Note that the station may be currently associated with a first VAP (i.e. belonging to a first WLAN) and willing to join a second WLAN.

802.11 networks make use of a number of options for the first phase of 802.11 probing or discovering. For instance, for an enterprise deployment, the search for a specific network may involve sending a probe request frame out on multiple channels that specifies the network name (SSID) and bit rates.

More generally, prior to association with the VAP, the stations gather information about the VAPs (or BSSs) by scanning the channels one by one either through passive scanning or active scanning.

In the passive scanning mode, the station scans through successively each 20 MHz channel and waits to listen for beacon frames (declaring one or more SSIDs) on the scanned channel, regardless of whether the stations has already connected to a specific SSID before or not.

In the active scanning mode, the stations send out probe request frames 310 on each wireless 20 MHz channel. The probe request frames may contain the SSID of a specific WLAN that the station is looking for or the probe request frames may not contain a specific SSID meaning the station is looking for "any" SSID in the vicinity of the station.

In response to receiving a probe request frame, the VAP checks whether the station has at least one common supported data rate or not. If there is a compatible data rate, the VAP responds with a probe response frame 320, the content of which is similar to a beacon frame: advertising of the SSID (wireless network name), of supported data rates, of encryption types if required, and of other 802.11 capabilities of the VAP.

An acknowledgment frame 330 may be sent by the station, in response to receiving the probe response frame 320.

It is also common for a station that is already associated with a VAP to send probe request frames regularly onto other wireless channels to maintain an updated list of available WLANs with best signal strengths. Thanks to this list, when the station can no longer maintain a strong connection with the VAP, it can roam to another VAP with a better signal strength using the second and third phases of the association procedure.

The second phase is the 802.11 authentication once a WLAN to join has been chosen by the station. In particular, the station chooses a compatible WLAN from the probe response frames it receives.

802.11 was originally developed with two authentication mechanisms: the first authentication mechanism, called "open authentication", is fundamentally a NULL authentication where the station says "authenticate me" and the VAP responds with "yes". This is the mechanism used in almost all 802.11 deployments; the second authentication mechanism, namely the WEP/WPA/WPA2, is a shared key mechanism that is widely used in home networks or small Wi-Fi deployments and provides security.

During the 802.11 authentication phase, the station sends a low-level 802.11 authentication request frame 340 to the selected VAP setting, for instance, the authentication to open and the sequence to 0x0001. The VAP receives the authentication request frame 340 and responds to the station with an authentication response frame 350 set to open indicating a sequence of 0x0002.

Note that some 802.11 capabilities allow a station to low-level authenticate to multiple VAPs without being associated with them (i.e. without belonging to corresponding WLANs). This speeds up the whole association procedure when the station moves between VAPs or APs. Indeed, while a station can be 802.11 authenticated to multiple VAPs, it can only be actively associated and transferring data through a single VAP or AP at a time.

Next, the station has to perform actual association with the VAP from the low level authentication step. This is the next phase of actual 802.11 association by which the station actually joins the WLAN cell. This stage finalizes the security and bit rate options and establishes the data link between the station and the VAP. The purpose of this final exchange is for the station to obtain an Association Identifier (AID) to be used to access the medium and send data within the joined WLAN.

Note that the station may have joined a first network and may roam from one VAP to another within the physical network. In that case, the association is called a re-association.

Once the station determines which VAP (i.e. WLAN) it would like to be associated with, the station sends an association request frame 360 to the selected VAP. The association request frame contains chosen encryption types if required and other compatible 802.11 capabilities.

If the elements in the association request frame match the capabilities of the VAP, the VAP creates an Association ID (AID) for the station and responds with an association response frame 370 with a success message granting network access to the station. Note that the AID has to be unique within the same physical AP, meaning the VAPs share the same range of AIDs.

Now the station is successfully associated with the VAP, data transfer can begin in the chosen WLAN using the physical medium.

Note that when a VAP receives a data frame from a station that is authenticated but not yet associated, the VAP responds with a disassociation frame placing the station into an authenticated but un-associated state. It results that the station must re-associate itself with the VAP to join the corresponding WLAN.

The probe response frame 320, authentication request/response frames 340 and 350 and association request/response frames 360 and 370 are unicast management frames emitted in an 802.11 legacy format, known as a single user (SU) format. This is a format used for point-to-point communication (here between a VAP and the station). Each of these unicast management frames is acknowledged by an ACK frame 330.

As indicated above, all the management frames (310, 320, 340, 350, 360, 370) and the ACK frames (330) use the lowest common rate supported by both the station and the VAP (e.g. 24 mbps or less).

To meet the ever-increasing demand for faster wireless networks to support bandwidth-intensive applications, 802.11ac and later versions (802.11ax for instance) implement larger bandwidth transmission through multi-channel operations. FIG. 4 illustrates an 802.11ac channel allocation that supports composite channel bandwidth of 20 MHz, 40 MHz, 80 MHz or 160 MHz, by aggregating 20 MHz component channels (400-1 to 400-8).

A station (including the AP) is granted a transmission opportunity (TxOP) through the enhanced distributed channel access (EDCA) mechanism on a 20 MHz channel, referred to as "primary channel" (400-3) shared by all stations in the same BSS.

To make sure that no station not belonging to the same BSS uses the secondary channels, it is provided that the control frames (e.g. RTS frame/CTS frame or trigger frame described below) reserving the composite channel are duplicated over each 20 MHz channel of the 40 MHz, 80 MHz or 160 MHz composite channel.

Developments in the 802.11ax standard seek to enhance efficiency and usage of the wireless channel for dense environments.

In this perspective, multi-user (MU) transmission features have been introduced, that allow multiple simultaneous transmissions to different users in both downlink (DL) and uplink (UL) directions, once a transmission opportunity has been reserved and granted to the AP.

To actually perform such multi-user transmission, a granted 20 MHz channel (400-1 to 400-4) is split into at least one sub-channel, but preferably into a plurality (usually between two to nine) of elementary sub-channels, or "sub-carriers" or "resource units" (RUs) or "traffic channels", that are shared in the frequency domain by multiple users, based for instance on Orthogonal Frequency Division Multiple Access (OFDMA) technique.

The multi-user feature of OFDMA allows the AP to assign different RUs to different stations in order to increase competition within a reserved transmission opportunity TXOP. This may help to reduce contention and collisions inside 802.11 networks.

In the MU downlink transmission (from the AP or VAP to the stations), the AP can directly send multiple data to multiple stations in the RUs, by simply providing specific indications within the preamble header of the PPDU sent during the TXOP, and then sending data in the data field.

Things are different for the MU Uplink transmissions, because the AP must control when and how (in which RU) the stations must emit data.

Contrary to the MU downlink transmission, a trigger mechanism has been adopted for the AP to trigger MU uplink communications from various non-AP stations. This is for the AP to have such control on the stations (for them to determine the Resource Units allocation) and to signal medium occupation to legacy stations (i.e. non-802.11ax stations) for them to set their NAV.

As shown in the example of FIG. 5, the AP sends a trigger frame (TF) 530 to the targeted 802.11ax stations to reserve a transmission opportunity TXOP 540.

Based on an AP's decision, the trigger frame TF may define a plurality of resource units (RUs) 510. The multi-user feature of OFDMA allows the AP to assign different RUs to different stations in order to increase competition.

The trigger frame 530 may define "Scheduled" RUs, which may be reserved by the AP for certain stations in which case no contention for accessing such RUs is needed for these stations. Such scheduled RUs and their corresponding scheduled stations are indicated in the trigger frame (by associating the AID provided to the station by the AP with the RU concerned). This explicitly indicates the station that is allowed to use each Scheduled RU. Such transmission mode is concurrent to the conventional EDCA mechanism.

A non-representative VAP may only assign Scheduled RUs to stations already registered with it. On the other hand, the representative VAP may also assign Scheduled RUs to stations registered with other VAPs (i.e. not belonging to its own BSS) implemented in the same physical AP.

The trigger frame TF 530 may also define "Random" RUs, in addition or in replacement of the "Scheduled" RUs. The Random RUs can be randomly accessed by stations. In other words, Random RUs designated or allocated by the AP in the TF may serve as basis for contention between stations willing to access the communication medium for sending data. The random RUs are signalled in the TF 530 by associating a specific reserved AID with these RUs. For instance, an AID equal to 0 is used to identify random RUs available for contention by stations associated with the AP emitting the trigger frame (i.e. belonging to the same BSS). On the other hand, an AID equal to 2045 may be used to identify random RUs available for contention by stations not yet associated with the AP Note that several random RUs with AID=0 and/or with AID=2045 may be provided by the same TF.

A random allocation procedure may be considered for 802.11ax standard based on an additional backoff counter (OFDMA backoff counter, or OBO counter or RU counter) for random RU contention by the 802.11ax non-AP stations, i.e. to allow them for performing contention between them to access and send data over a Random RU. The RU backoff counter is distinct from the classical EDCA backoff counters (as defined in 802.11e version). However data transmitted in an accessed OFDMA RUs 510 is assumed to be served from same EDCA traffic queues.

The RU random allocation procedure comprises, for a station of a plurality of 802.11ax stations having an positive RU backoff value (initially drawn inside an RU contention window range), a first step of determining, from a received trigger frame, the sub-channels or RUs of the communication medium available for contention (the so-called "random RUs", either identified by a value 0 for already-associated stations or a value 2045 for not-yet-associated stations), a second step of verifying if the value of the RU backoff value local to the considered station is not greater than the number of detected-as-available random RUs, and then, in case of successful verification, a third step of randomly selecting a RU among the detected-as-available RUs to then send data. In case the second step is not verified, a fourth step (instead of the third) is performed in order to decrement the RU backoff counter by the number of detected-as-available random RUs.

As one can note, a station having no Scheduled RU is not guaranteed to perform OFDMA transmission over a random RU for each TF received. This is because at least the RU backoff counter is decremented upon each reception of a Trigger Frame by the number of proposed Random RUs, thereby differing data transmission to a subsequent trigger frame (depending of the current value of the RU backoff number and of the number of random RUs offered by each of further received TFs).

The stations use the Scheduled and/or Random RUs to transmit data, in particular MAC data frames during TXOP 540.

In response to the data transmission, the AP sends a Multi-User Block Acknowledgment frame 550 to acknowledge the data received on each RU.

The MU Uplink (UL) medium access scheme, including both scheduled RUs and random RUs, proves to be very efficient compared to conventional EDCA access scheme, especially in dense environments as envisaged by the 802.11ax standard. This is because the number of collisions generated by simultaneous medium access attempts and the overhead due to the medium access are both reduced.

Such functioning when the multiple BSS feature is implemented is explained now with reference to FIG. 6 which illustrates a sequence diagram of data exchange between a non-AP station and a VAP via the MU Uplink OFDMA access scheme as defined in 802.11ax.

Non-AP station 610 is assumed to be associated with non-representative VAP 620 (corresponding to the BSSID #2) or is intended to be associated with it.

First, the station waits for the reception of a trigger frame 530 from VAP 620 to transmit data via the MU Uplink OFDMA access scheme.

Then, comes the time when VAP 620 sends a trigger frame 650 which is received by non-AP station 610.

Non-AP station 610 analyses trigger frame 650 to determine whether or not it can send data (an 802.11 MAC data or management frame) in a dedicated RU either scheduled (RU identified according to the AID of station 610) or random (according to the RU random allocation procedure described above). In case of positive determining, station 610 builds an 802.11 MAC frame as shown in FIG. 2*a*.

If the 802.11 MAC frame to be constructed is a data frame, address 1 field (RA/BSSID) is set to the 48-bit IEEE MAC address of VAP 620, i.e. to BSSID #2; address 2 field (TA/SA) is set to the 48-bit IEEE MAC address of station 610 and address 3 (DA) is set to the 48-bit IEEE MAC address of the final station to which the data provided in the payload part 308 are intended.

If the 802.11 MAC frame to be constructed is a management frame, address 1 field (DA) is set to the 48-bit IEEE MAC address of VAP 620, i.e. to BSSID #2, address 2 field (SA) is set to the 48-bit IEEE MAC address of station 610 and address 3 (BSSID) is set also to the 48-bit IEEE MAC address of VAP 620, i.e. to BSSID #2.

Constructed MAC frame 660 is then sent in the dedicated RU to VAP 620.

In case of MAC frame 660 is a request from station 610 to VAP 620, VAP 620 may provide a response by sending a response frame 670 to station 610.

If response frame 670 is a data frame, address 1 field (RA/BSSID) is set to the 48-bit IEEE MAC address of VAP 620, i.e. to BSSID #2; address 2 field (TA/SA) is also set to the 48-bit IEEE MAC address of VAP 620, i.e. to BSSID #2 and address 3 (DA) is set to the 48-bit IEEE MAC address of station 610.

If response frame 670 is a management frame, address 1 field (DA) is set to the 48-bit IEEE MAC address of station 610, address 2 field (SA) is set to the 48-bit IEEE MAC address of VAP 620, i.e. to BSSID #2 and address 3 (BSSID) is also set to the 48-bit IEEE MAC address of VAP 620, i.e. to BSSID #2.

The process of FIG. 6 happens as soon as a trigger frame 530/650 is received by station 610 from VAP 620. However, the waiting time before receiving such a trigger frame may be important, in particular in dense networks where a large number of VAPs (or BSSs) are implemented by the physical AP. Indeed, the other VAPs may be granted TXOPs before VAP 620 actually accesses the medium through conventional EDCA and sends trigger frame 620.

This waiting time may become detrimental to user experience, for instance regarding real-time applications (data are sent too rarely) or regarding the association process by which a user station may join a WLAN (the users do not accept waiting for a long time in such process).

These various drawbacks of the current version of 802.11ax show that a more efficient usage of the MU Uplink transmission is sought when the multi BSS feature is enabled.

The inventors have contemplated allowing the stations to use specific RUs in MU Uplink transmissions provided by VAPs different from their own VAP (with which they have registered) to provide more frequent access to the medium for these stations. An idea of the inventors to make this approach workable is to configure the VAP receiving the MU Uplink transmissions (i.e. the VAP having sent the corresponding trigger frame) to forward data received from a station belonging to another BSS to the appropriate other VAP.

A first virtual access point managing a first group of stations thus sends a trigger frame identifying the first group of stations, to reserve a transmission opportunity on at least one communication channel of the wireless network, the transmission opportunity including resource units that form the communication channel and that stations access to transmit data during the reserved transmission opportunity.

A transmitting station willing to transmit data to a second virtual access point managing a second (and different) group of stations thus receives the sent trigger frame, accesses one of the resource units not assigned to a specific device during the transmission opportunity and transmits data (e.g. data frame or management frame) intended to the second virtual access point, over the accessed resource unit to the first virtual access point.

In response to the trigger frame, the first virtual access point thus receives, over one of the resource units during the reserved transmission opportunity, data from the transmitting station and addressed to the second virtual access point managing a second group of stations, different from the first group identified in the trigger frame; and decides to forward the received data to the second virtual access point managing the second group of stations.

The first virtual access point may thus forward data received over a Scheduled RU used by a station registered with another VAP, but also forward data generally received over a Random RU used by a station registered with another VAP or willing to register with such other VAP.

Specific and exemplary implementations of these mechanisms are described in details below.

It results that a station, already registered or not with a VAP, can communicate more frequently with its VAP through MU Uplink transmissions triggered by any VAP, be it a non-representative or a representative VAP.

MU Uplink transmission is thus significantly improved compared to known current 802.11ax requirements.

FIG. 7 schematically illustrates a communication device 700, either a non-AP station 101-107 or the access point 110, of the radio network 100, configured to implement at least one embodiment of the present invention. The communication device 700 may preferably be a device such as a micro-computer, a workstation or a light portable device. The communication device 700 comprises a communication bus 713 to which there are preferably connected:

- a central processing unit 711, such as a microprocessor, denoted CPU;
- a read only memory 707, denoted ROM, for storing computer programs for implementing the invention;
- a random access memory 712, denoted RAM, for storing the executable code of methods according to embodiments of the invention as well as the registers adapted to record variables and parameters necessary for implementing methods according to embodiments of the invention; and
- at least one communication interface 702 connected to the radio communication network 100 over which digital data packets or frames or control frames are transmitted, for example a wireless communication network according to the 802.11ax protocol. The frames are written from a FIFO sending memory in RAM 712 to the network interface for transmission or are read from the network interface for reception and writing into a FIFO receiving memory in RAM 712 under the control of a software application running in the CPU 711.

Optionally, communication device 700 may also include the following components:

- a data storage means 704 such as a hard disk, for storing computer programs for implementing methods according to one or more embodiments of the invention;
- a disk drive 705 for a disk 706, the disk drive being adapted to read data from the disk 706 or to write data onto said disk;
- a screen 709 for displaying decoded data and/or serving as a graphical interface with the user, by means of a keyboard 710 or any other pointing means.

The communication device 700 may be optionally connected to various peripherals, such as for example a digital camera 708, each being connected to an input/output card (not shown) so as to supply data to the communication device 700.

Preferably the communication bus provides communication and interoperability between the various elements included in the communication device 700 or connected to it. The representation of the bus is not limiting and in particular the central processing unit is operable to communicate instructions to any element of the communication device 700 directly or by means of another element of the communication device 700.

The disk 706 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may optionally be stored either in read only memory 707, on the hard disk 704 or on a removable digital medium such as for example a disk 706 as described previously. According to an optional variant, the executable code of the programs can be received by means of the communication network 703, via the interface 702, in order to be stored in one of the storage means of the communication device 700, such as the hard disk 704, before being executed.

The central processing unit 711 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 704 or in the read only memory 707, are transferred into the random access memory 712, which then contains the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

FIG. 8 is a block diagram schematically illustrating the architecture of the communication device 700, either the AP 110 or one of stations 101-107, adapted to carry out, at least partially, the invention. As illustrated, device 700 comprises a physical (PHY) layer block 803, a MAC layer block 802, and an application layer block 801.

The PHY layer block 803 (here an 802.11 standardized PHY layer) has the task of formatting, modulating on or demodulating from any 20 MHz channel or the composite channel, and thus sending or receiving frames over the radio medium used 100, such as 802.11 frames, for instance medium access trigger frames TF 530 (FIG. 5) to reserve a transmission slot, MAC data and management frames based on a 20 MHz width to interact with legacy 802.11 stations, as well as of MAC data frames of OFDMA type having smaller width than 20 MHz legacy (typically 2 or 5 MHz) to/from that radio medium.

The MAC layer block or controller 802 preferably comprises a MAC 802.11 layer 804 implementing conventional 802.11ax MAC operations, and additional blocks 805 and 806 for carrying out, at least partially, the invention. The MAC layer block 802 may optionally be implemented in software, which software is loaded into RAM 712 and executed by CPU 711.

Preferably, additional block 805, referred to as multiple-BSS management module for controlling access to random OFDMA resource units (sub-channels) in case of multiple BSSs, implements the part of embodiments of the invention that regards non-AP station and/or VAP operations of device 700.

Additional block 806, referred as to OFDMA module for configuring and updating the OFDMA-based MU Uplink random access procedure, implements the part of embodiments of the invention that regards non-AP station operations of device 700. The same block 806 may handle the OFDMA-based MU Downlink random access procedure for the VAPs.

For instance and not exhaustively, the operations for the VAP may include generating and sending beacon frames sometimes identifying a plurality of groups, instead of a single BSS; generating and sending trigger frames providing RUs for stations of one or more other BSSs; processing frames received in such RUs to forward them to appropriate VAPs within the same physical AP; building and sending responses to requests received from stations; processing responses to forward them to another VAP in the physical AP for efficient transmission to requesting stations.

The operations for a non-AP station may include analyzing trigger frames received from VAPs to determine if the station is allowed to access some random RUs in the context of multi-BSS, and then to actually access such a RU to transmit, during MU Uplink OFDMA transmission, frames to other VAPs via the VAPs having sent the trigger frames.

MAC 802.11 layer 804, multiple-BSS management module 805 and OFDMA module 806 interact one with the other in order to process accurately communications over MU Uplink OFDMA RUs provided to multiple BSSs according to embodiments of the invention.

On top of the Figure, application layer block 801 runs an application that generates and receives data packets, for example data packets of a video stream. Application layer block 801 represents all the stack layers above MAC layer according to ISO standardization.

Embodiments of the present invention are now illustrated using various exemplary embodiments in the context of IEEE 802.11ax by considering OFDMA RUs dedicated to multiple BSSs.

Although the proposed examples are also mainly described with reference to the 802.11ax trigger frames and the management frames of the 802.11 association process, the present invention is not limited to such frames.

Figure 10:
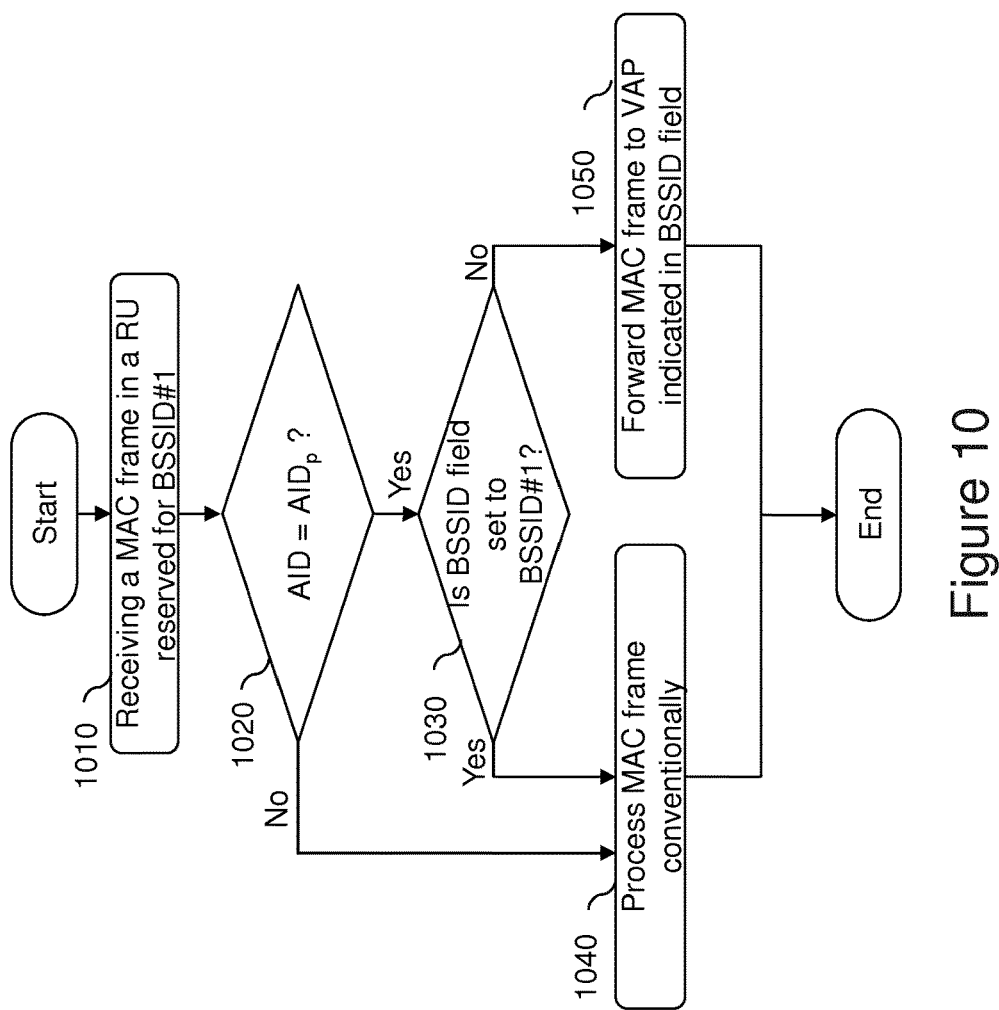
FIG. 10 illustrates, using a flowchart, corresponding exemplary operations at a virtual AP according to embodiments of the invention.
Figure 9:
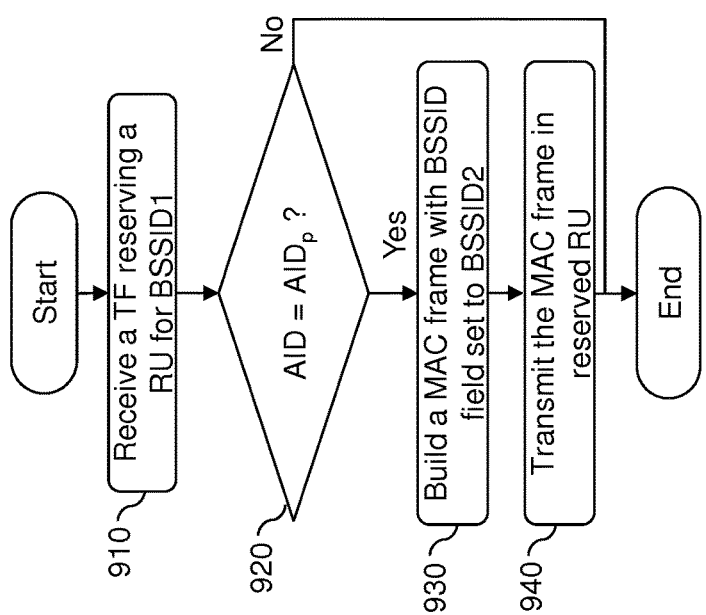
FIG. 9 illustrates, using a flowchart, exemplary operations at a non-AP station according to embodiments of the invention.

FIG. 9 illustrates, using a flowchart, exemplary operations at a non-AP station according to embodiments of the invention. FIG. 10 illustrates, using a flowchart, corresponding exemplary operations at a VAP according to embodiments of the invention.

FIG. 11 illustrates a sequence diagram of corresponding data exchange in 802.11ax from a non-AP station to a physical AP supporting the Multi-BSSID functionality according to embodiments of the invention.

Non-AP station 1101 (implementing the operations of FIG. 9) is assumed to be associated or intended to be associated (in which case its current state is non-associated) with VAP 1103, referred to as Virtual AP #2, having BSSID #2. Station 1101 is thus willing to transmit data (e.g. data frame or management frame) to VAP #2.

At step 910, a trigger frame 1110 is received from virtual AP #1 1102 corresponding to BSSID #1 (identified by a TA address equal to BSSID #1) which is preferably a non-representative VAP (the representative VAP being virtual AP #0). In the state of the art, only the non-AP stations associated or intended to be associated with VAP #1 (having BSSID #1) may participate to the MU Uplink OFDMA transmission initiated by received trigger frame 1110. Consequently, stations as in the state of the art (not implementing the present invention) directly discard trigger frame 1110.

Note that when a trigger frame is sent by the representative VAP, the non-AP station does not directly discard the trigger frame, but checks whether or not one Scheduled RU is assigned to it, in order to use it, if any.

On the contrary, with the present invention, station 1101 analyses received trigger frame 1110 at step 920. In particular, the station checks whether or not the received trigger frame provides a RU not assigned to a specific station and opened to stations not related to BSS #1 managed by VAP #1, i.e. whether or not trigger frame 1110 has assigned one or more dedicated/predefined RUs to stations not belonging to BSS #1. This is a Random RU in the meaning that the stations may gain access to it using contention.

For instance, such a RU may be identified by a given AID not associated with a specific station by the VAPs, referred to as AIDp.

As an example, $AID_p$ may take a first AID value, for instance equal to 0, to signal a resource unit in which any station already registered with any virtual access point implemented by the physical access point can transmit data.

As another example, $AID_p$ may take a second AID value, for instance equal to 2045, to signal a resource unit in which only a station not yet registered with one of the virtual access points can transmit data, i.e. stations willing to register with one of the virtual APs.

By this mechanism, the invention offers new possibilities to stations to participate to a MU Uplink transmission initiated (through a trigger frame) by a first virtual AP, even if the stations are associated (or intended to be associated) with another virtual AP.

Step 920 may optionally check whether the identified RU with $AID=AID_p$ can be accessed by the station. For instance, the station may apply the RU random allocation procedure described above (are there more random RUs with $AID=AID_p$ than an OBO backoff counter local to the station?) in order to know if it is allowed to use the RU (to transmit the MAC data) in the current MU Uplink OFDMA transmission or if it needs to wait for a next opportunity of medium access.

In case of positive checking at step 920 (a RU assigned to an AID equal to AIDp has been identified), next step is step 930; otherwise the algorithm ends.

Through steps 930 and 940, the station "catches" the current MU Uplink OFDMA transmission, although it is not initiated within its own BSS. Consequently the invention allows an access to the medium by the stations to be made faster in order to transmit data.

At step 930, the station builds the MAC frame to be sent with appropriate address fields. Various embodiments may be implemented, each of which provides that the MAC frame includes a frame header in which at least one address field is set to a basic service set identification, BSSID, uniquely identifying the second group of stations, i.e. BSSID #2 in the present example of FIG. 11.

The embodiments differ from one another in that the at least one address field having BSSID #2 in the above example includes one or the other or both of a receiver address and a destination address signalled in the frame header. Note that the frame header may further include a source address field set to an address of the station being about to transmit the data.

According to first embodiments, only the field usually corresponding to the BSSID of the BSS in which the MU UL OFDMA transmission takes place is modified by replacing BSSID #1 (because the trigger frame has been sent by VAP #1) by BSSID #2.

In the case of an 802.11 MAC data frame, address 1 field (RA/BSSID) is set to BSSID #2 (instead of BSSID #1), i.e. to the 48-bit IEEE MAC address of VAP #2 1103, address 2 field (TA/SA) is set to the 48-bit IEEE MAC address of station 1101 (as done conventionally) and address 3 (DA) is set to the 48-bit IEEE MAC address of the final station (as done conventionally).

In case of an 802.11 MAC management frame (such as frames 310, 340, 360), address 1 field (DA) is set to the 48-bit IEEE MAC address of the final station (as done conventionally), address 2 field (SA) is set to the 48-bit IEEE MAC address of station 1101 (as done conventionally) and address 3 is set to BSSID #2 (instead of BSSID #1), i.e. to the 48-bit IEEE MAC address of VAP #2 1103.

In this way, contrary to the known techniques, a frame with a BSSID address field (address 1 field for data frame and address 3 field for management frame) equal to a given BSSID (BSSID #2) is sent during a TXOP initiated by a VAP corresponding to another BSSID (BSSID #1).

Second embodiments regard the case where the final station is the access point itself (which thus not act only as a mere relay to a final station). In terms of address fields, it means the DA address field should normally be set to BSSID #1, the VAP initiating the MU Uplink OFDMA transmission.

In the second embodiments, only the field corresponding to the DA is modified by replacing BSSID #1 by BSSID #2.

In the case of an 802.11 MAC data frame, address 1 field (RA/BSSID) is set to BSSID #1, i.e. to the 48-bit IEEE MAC address of VAP #1 1102 having sent the trigger frame (as done conventionally), address 2 field (TA/SA) is set to the 48-bit IEEE MAC address of station 1101 (as done conventionally) and address 3 (DA) is set to BSSID #2 (instead of BSSID #1), i.e. to the 48-bit IEEE MAC address of VAP #2 1103.

In case of an 802.11 MAC management frame (such as frames 310, 340, 360), address 1 field (DA) is set to BSSID #2 (instead of BSSID #1), i.e. to the 48-bit IEEE MAC address of VAP #2 1103, address 2 field (SA) is set to the 48-bit IEEE MAC address of station 1101 (as done conventionally) and address 3 is set to BSSID #1, i.e. to the 48-bit IEEE MAC address of VAP #1 1102 having sent the trigger frame (as done conventionally).

Third embodiments combine the first and second embodiments. Thus they also regard the case where the final station is the access point itself.

In the third embodiments, both fields corresponding to DA and to BSSID are modified by replacing BSSID #1 by BSSID #2.

In the case of an 802.11 MAC data frame, address 1 field (RA/BSSID) is set to BSSID #2 (instead of BSSID #1), i.e. to the 48-bit IEEE MAC address of VAP #2 1103, address 2 field (TA/SA) is set to the 48-bit IEEE MAC address of station 1101 (as done conventionally) and address 3 (DA) is also set to BSSID #2 (instead of BSSID #1).

In case of an 802.11 MAC management frame (such as frames 310, 340, 360), address 1 field (DA) is set to BSSID #2 (instead of BSSID #1), i.e. to the 48-bit IEEE MAC address of VAP #2 1103, address 2 field (SA) is set to the 48-bit IEEE MAC address of station 1101 (as done conventionally) and address 3 is also set to BSSID #2 (instead of BSSID #1).

Thanks to the indication of BSSID #2 in the MAC frames received by VAP #1, the latter will be able to decide when processing by its own the received MAC frames or when forwarding them to another VAP, as described below.

Next to step 930, step 940 transmits the built frame 1120 over the dedicated RU determined at step 920.

Turning now to FIG. 10, VAP #1 receives, at step 1010 and in response to sent trigger frame 1110 and over one of the resource units during the reserved transmission opportunity, a MAC frame from transmitting station 1101. In use, VAP #1 received plenty of MAC frames over plenty of RUs respectively. For instance, the physical AP receiving (at its physical layer 803) the MAC frame may directly transmit the MAC frame to the VAP having transmitted the trigger frame, i.e. to VAP #1 in the present example.

The process below is performed for each received MAC frame.

At step 1020, VAP #1 determines whether or not the MAC frame has been received over a RU open to stations not related to BSS #1 managed by VAP #1. In particular, VAP #1 determines whether or not this RU has an AID equal to an AID not associated with a specific station, such as $AID_p=0$ or 2045.

In case of positive determining, next step is 1030; otherwise the process goes to step 1040 to process the MAC frame conventionally.

As the stations (associated or intended to be associated with a VAP) may belong to any virtual AP implemented by the physical AP and not only to VAP #1 (as in the known techniques), next step 1030 checks whether or not the MAC frame is to be addressed to a VAP different from VAP #1, for instance to be addressed to VAP #2 in the above example.

This may comprise, for VAP #1, to determine whether or not a frame header of the received MAC frame includes an address field set to the BSSID uniquely identifying a second group of stations, i.e. to BSSID #2 in the example. In particular, VAP #1 checks address 1 field and/or address 3 field according to the embodiments described above.

In case of positive determining, the MAC frame has to be addressed to VAP #2. Thus next step is step 1050. Otherwise, the process goes to step 1040.

At step 1050, VAP #1 forwards (internally within physical AP 110 reference 1130 in FIG. 11) the received MAC frame to the VAP corresponding to the BSSID (different from BSSID #1) indicated in the frame header, i.e. to VAP #2 in the example of FIG. 11. Note that for the forwarding, the address fields of the MAC frame do not need to be modified.

At that time, VAP #2 1103 receives the MAC frame sent by station 1101, via intermediary VAP #1 1102. It then processes it accordingly. For instance, if VAP #2 is a gateway to another (external) network to which a station identified in the DA address field of the frame header belongs, VAP #2 may merely retransmit the MAC frame in said other network to the station identified in the DA address field. In response, VAP #2 may receive other data from this station to be transmitted to transmitting station 1101.

Things are quite similar when the MAC frame is a management frame. In that case, VAP #2 may generate by its own a response to the received management frame.

Note that the embodiments described above with reference to FIGS. 9 to 11 may implement the reception of the MAC frame by the physical AP and then a transmission of the received MAC frame to VAP #1 having initially transmitted the trigger frame. Variants may however be contemplated. For instance, the received MAC frame may be broadcast, i.e. forwarded, by the physical layer 803 of physical AP 110 to each and every VAP it implements, and each of these VAPs is responsible for locally processing the MAC frame. This variant reduces latency.

FIG. 12 illustrates, using a flowchart, exemplary operations at the addressee virtual access point according to embodiments of the invention. FIG. 13 illustrates sequence diagrams of corresponding data exchange in 802.11ax from the addressee VAP according to various embodiments of the invention.

At step 1210, VAP #2 receives the MAC frame from VAP #1 as indicated above, said MAC frame having been sent originally by transmitting non-AP station 1101 identified by address SA in the frame header of the received MAC frame.

For instance, the DA address filed of the received MAC frame corresponds to BSSID #2, meaning that the received MAC frame corresponds to a request management frame (310, 340, 360) and that a response is required from VAP #2.

Next, step 1220 consists for VAP #2 to generate a response (e.g. 320, 350, 370) to the received MAC frame. The response may also be the data provided by a station in an external network in response to the original MAC frame 1120.

And VAP #2 1103 transmits the MAC frame response to transmitting station 1101 during step 1230. Various embodiments are contemplated in which the MAC frame response is transmitted directly to the transmitting station or forwarded to another virtual access point implemented at the physical access point for transmission to the transmitting station, said other virtual access point being possible VAP #1 1102 having sent original trigger frame 1110) or the representative virtual access point, noted VAP #0 1104.

In the case with response forwarding, a frame header of the response include a receiver address field set to a basic service set identification, BSSID, uniquely identifying the group of stations managed by the other virtual access point (forwarding the response), a transmitter address field set to a BSSID uniquely identifying the current VAP, VAP #2 in the example, and a destination address field set to an address of the transmitting station 1101.

Direct-transmission embodiments are illustrated in section (a) of FIG. 13. The MAC frame response 1310 is transmitted directly to transmitting station 1101 using a Single User EDCA transmission as known in 802.11.

In such a case, in the case of an 802.11 MAC data response frame, address 1 field (RA/BSSID) is set to BSSID #2, address 2 field (TA/SA) is set to BSSID #2 and address 3 (DA) is set to the 48-bit IEEE MAC address of transmitting station 1101.

In the case of an 802.11 MAC management response frame, address 1 field (DA) is set to the 48-bit IEEE MAC address of transmitting station 1101, address 2 field (SA) is set to BSSID #2 and address 3 (BSSID) is also set to BSSID #2.

In the direct-transmission embodiments, the transmitting station receives a response to the transmitted data, directly from the second virtual access point.

Embodiments with a relay by a non-representative VAP, for instance VAP #1 1102 having sent the original trigger frame 1110, are illustrated in section (b) of FIG. 13. The MAC frame response is forwarded (1320) to VAP #1 1102 for transmission to transmitting station 1101.

In such a case, in the case of an 802.11 MAC data response frame, address 1 field (RA/BSSID) is set to BSSID #1 (instead of BSSID #2 when VAP #2 wishes to send data to a station), address 2 field (TA/SA) is set to BSSID #2 and address 3 (DA) is set to the 48-bit IEEE MAC address of transmitting station 1101.

In the case of an 802.11 MAC management response frame, address 1 field (DA) is set to the 48-bit IEEE MAC address of transmitting station 1101, address 2 field (SA) is set to BSSID #2 and address 3 is set to BSSID #1 (instead of BSSID #2).

In such a case, when VAP #1 1102 receives the MAC response frame, it may use, to relay the MAC response frame 1330 to transmitting station 1101, the same TXOP that the TXOP used for the MU Uplink OFDMA transmission having conveyed the MAC request frame 1120. In that way, packet latency is reduced.

Embodiments with a relay by the representative VAP, namely VAP #0 1104, are illustrated in section (c) of FIG. 13. The MAC frame response is forwarded (1340) to VAP #0 1104 for transmission to transmitting station 1101.

In such a case, in the case of an 802.11 MAC data response frame, address 1 field (RA/BSSID) is set to BSSID #0 (instead of BSSID #2 when VAP #2 wishes to send data to a station), address 2 field (TA/SA) is set to BSSID #2 and address 3 (DA) is set to the 48-bit IEEE MAC address of transmitting station 1101.

In the case of an 802.11 MAC management response frame, address 1 field (DA) is set to the 48-bit IEEE MAC address of transmitting station 1101, address 2 field (SA) is set to BSSID #2 and address 3 (BSSID) is set to BSSID #0 (instead of BSSID #2).

In such a case, all the MAC response frames are concentrated to the representative VAP which in turn may efficient use a MU Downlink OFDMA transmission to transmit all the responses 1350 together shortly.

In embodiments with a relay, transmitting station 1101 receives a response to the transmitted data, from VAP #2 via another VAP implemented at the physical access point.

The above-described embodiments of the invention may be used by transmitting station 1101 to perform an association procedure with VAP #2.

Figure 14:
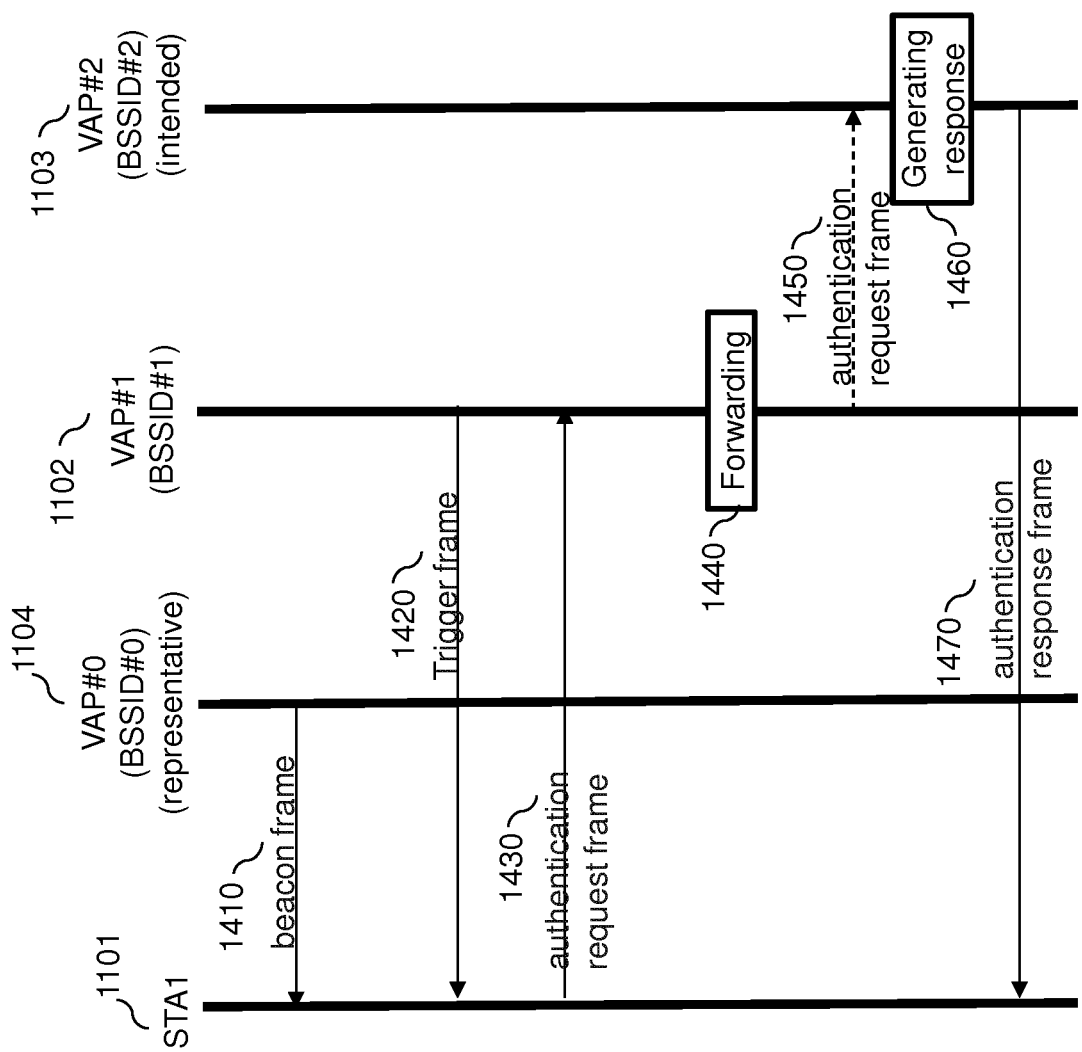
FIG. 14 illustrates an exemplary sequence of management frames allowing a station to discover and associate with a virtual AP according to embodiments of the invention.

FIG. 14 illustrates an exemplary sequence of management frames allowing such a station to discover and associate with VAP #2 according to embodiments of the invention.

Station 1101 not yet associated with a VAP receives a beacon frame 1410 from representative VAP #0 1104 (corresponding to the BSSID #0). The beacon frame 1410 contains the profiles of all VAPs (including representative and non-representative VAPs) inside Multiple BSSID elements. In this way, station 1101 is provided with the list of all available VAPs and BSSs (and their capabilities which are contained in the non-transmitted profiles). Station 1101 is able to select one of the VAPs without sending a probe request 310.

In the present example, station 1101 selects VAP #2 1103 (corresponding to BSSID #2).

Next step of the association process is the transmission of an authentication request frame 340 by station 1101. To do that, station 1101 waits for a next opportunity to access the medium, which is here provided in an MU Uplink OFDMA transmission initiated by VAP #1.

Thus, station 1101 receives a trigger frame 1420 from VAP #1 1102 corresponding to the BSSID #1. Using the teachings of the present invention, station 1101 catches this current MU Uplink OFDMA transmission by applying above step 910 to 940 to select and access an RU with AID=2045 to transmit the authentication request frame 1430.

VAP #1 1102 receives the authentication request frame and forward it (1440) to VAP #2 within the physical AP 110, by applying above steps 1010, 1020, 1030 and 1050.

VAP #2 thus receives the authentication request frame 1450 and generates (1460) an authentication response frame 1470 by applying above steps 1210 and 1220. The authentication response frame 1470 is sent by applying above step 1230.

As depicted in FIG. 14, the first embodiment with direct transmission to station 1101 (FIG. 13a) is illustrated.

Station 1101 thus receives the authentication response frame 1470.

The next step in the association process is the transmission of the association request frame 360 by station 1101 to receive an association response frame 370 from VAP #2. This next step can be performed in a similar way as described above for the authentication request frame and the authentication response frame (references 1420 to 1470).

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A wireless communication method in a wireless network comprising a physical access point and stations, the physical access point implementing a plurality of virtual access points, each virtual access point managing a group of stations, the method comprising following steps, at a transmitting station willing to transmit data to a second virtual access point managing a second group of stations:

receiving a trigger frame from a first virtual access point managing a first group of stations different from the second group, the trigger frame reserving a transmission opportunity on at least one communication channel of the wireless network, the transmission opportunity including resource units that form the communication channel and that stations can access to transmit data during the reserved transmission opportunity; and accessing one of the resource units during the transmission opportunity and transmitting data intended to the second virtual access point, over the accessed resource unit to the first virtual access point.

2. The method of claim 1, wherein a single one of the virtual access points is a representative virtual access point authorized to broadcast network information about a non-representative virtual access point and the first virtual access point is a non-representative virtual access point.

3. The method of claim 1, wherein any station registering with a virtual access point is associated with a unique association identifier used by the virtual access point to assign, to the station, a resource unit in a transmission opportunity granted to the virtual access point, and the resource unit conveying the data of the transmitting station is assigned to an association identifier not associated with a specific station.

4. The method of claim 3, wherein the association identifier not associated with a specific station takes a first AID value to signal a resource unit in which any station already registered with any virtual access point implemented by the physical access point can transmit data.

5. The method of claim 4, wherein the first AID value equals 0.

6. The method of claim 3, wherein the association identifier not associated with a specific station takes a second AID value to signal a resource unit in which only a station not yet registered with one of the virtual access points can transmit data.

7. The method of claim 6, wherein the second AID value equals 2045.

8. The method of claim 1, wherein the transmitted data include a data frame intended to the second virtual access point.

9. The method of claim 1, wherein the transmitted data include a management frame intended to the second virtual access point within a procedure of associating the transmitting station with the second virtual access point.

10. The method of claim 1, wherein the resource unit conveying the data of the transmitting station is a random resource unit to which stations randomly access using contention-based access.

11. The method of claim 1, wherein the data include a frame header in which at least one address field is set to a basic service set identification, BSSID, uniquely identifying the second group of stations.

12. The method of claim 11 further comprising, at the first virtual access point, determining whether a frame header of the received data includes an address field set to the BSSID uniquely identifying the second group of stations, and forwarding the received data in case of positive determining.

13. The method of claim 11, wherein the at least one address field includes one or both of a receiver address and a destination address signalled in the frame header.

14. The method of claim 13, wherein the frame header further includes a source address field set to an address of the transmitting station.

15. The method of claim 11, wherein the BSSID uniquely identifying the second group of stations is a 48-bit MAC address assigned to the second virtual access point.

16. The method of claim 1, further comprising, at the transmitting station, receiving a response to the transmitted data, directly from the second virtual access point or from the second virtual access point via another virtual access point implemented at the physical access point.

17. The method of claim 1, wherein the transmitted data include a MAC frame embedded in an 802.11ax frame.

18. A wireless communication method in a wireless network comprising a physical access point and stations, the physical access point implementing a plurality of virtual access points, each virtual access point managing a group of stations, the method comprising following steps, at the physical access point:

sending, by a first virtual access point managing a first group of stations, a trigger frame to reserve a transmission opportunity on at least one communication channel of the wireless network, the transmission opportunity including resource units that form the communication channel and that stations can access to transmit data during the reserved transmission opportunity;

in response to the trigger frame, receiving, over one of the resource units during the reserved transmission opportunity, data from a transmitting station and addressed to a second virtual access point managing a second group of stations, different from the first group of stations; and forwarding the received data to the second virtual access point managing the second group of stations.

19. The method of claim 18, wherein the steps of receiving and forwarding are performed by the first virtual access point.

20. The method of claim 18, further comprising, at the second virtual access point:

generating a response to the received data, and transmitting directly the generated response to the transmitting station or forwarding the generated response to another virtual access point implemented at the physical access point for transmission to the transmitting station.

21. The method of claim 20, wherein the other virtual access point is the first virtual access point or a representative virtual access point.

22. The method of claim 20, wherein a frame header of the response includes a receiver address field set to a basic service set identification, BSSID, uniquely identifying the group of stations managed by the other virtual access point, a transmitter address field set to a BSSID uniquely identifying the second group of stations managed by the second virtual access point and a destination address field set to an address of the transmitting station.

23. A wireless communication device forming station in a wireless network comprising a physical access point and stations, the physical access point implementing a plurality of virtual access points, each virtual access point managing a group of stations, the device forming station willing to transmit data to a second virtual access point managing a second group of stations and comprising at least one microprocessor configured for carrying out steps of:

receiving a trigger frame from a first virtual access point managing a first group of stations different from the second group, the trigger frame reserving a transmission opportunity on at least one communication channel of the wireless network, the transmission opportunity including resource units that form the communication channel and that stations can access to transmit data during the reserved transmission opportunity; and accessing one of the resource units during the transmission opportunity and transmitting data intended to the second virtual access point, over the accessed resource unit to the first virtual access point.

24. A wireless communication device forming physical access point and comprising at least one microprocessor configured for implementing a plurality of virtual access points, each virtual access point managing a group of stations, the microprocessor being further configured for carrying out steps of:

sending, by a first virtual access point managing a first group of stations, a trigger frame to reserve a transmission opportunity on at least one communication channel of the wireless network, the transmission opportunity including resource units that form the communication channel and that stations can access to transmit data during the reserved transmission opportunity;

in response to the trigger frame, receiving, over one of the resource units during the reserved transmission opportunity, data from a transmitting station and addressed to a second virtual access point managing a second group of stations, different from the first group of stations; and forwarding the received data to the second virtual access point managing the second group of stations.

* * * * *